US012669818B2

(12) United States Patent
Urano et al.

(10) Patent No.: US 12,669,818 B2
(45) Date of Patent: Jun. 30, 2026

(54) REMOTE CONTROL REQUEST SYSTEM, REMOTE CONTROL REQUEST METHOD, AND NONTRANSITORY STORAGE MEDIUM

(71) Applicant: TOYOTA JIDOSHA KABUSHIKI KAISHA, Toyota (JP)

(72) Inventors: Hiromitsu Urano, Numazu (JP); Sho Otaki, Yokohama (JP); Takashi Suzuki, Susono (JP); Toru Takashima, Susono (JP); Hojung Jung, Shizuoka-ken (JP); Hiromitsu Kobayashi, Nisshin (JP); Satoru Niwa, Shizuoka-ken (JP); Kosuke Akatsuka, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 589 days.

(21) Appl. No.: 17/833,387

(22) Filed: Jun. 6, 2022

(65) Prior Publication Data

US 2022/0397898 A1      Dec. 15, 2022

(30) Foreign Application Priority Data

Jun. 9, 2021      (JP) ................................. 2021-096879

(51) Int. Cl.
*G05D 1/00* (2024.01)
*G05D 1/227* (2024.01)

(52) U.S. Cl.
CPC ......... *G05D 1/0061* (2013.01); *G05D 1/0022* (2013.01); *G05D 1/0214* (2013.01); *G05D 1/2279* (2024.01)

(58) Field of Classification Search
CPC .. G05D 1/0061; G05D 1/0022; G05D 1/0214; G05D 1/0016; G05D 1/0055
See application file for complete search history.

(56) References Cited

U.S. PATENT DOCUMENTS

| | | | |
|---|---|---|---|
| 12,202,512 B1 * | 1/2025 | King ..................... | B60W 50/06 |
| 2017/0015313 A1 * | 1/2017 | Mei ........................ | B60W 10/04 |
| 2018/0335781 A1 * | 11/2018 | Chase .................. | G08G 1/0133 |
| 2019/0042859 A1 * | 2/2019 | Schubert .................. | G05D 1/00 |
| 2019/0163176 A1 | 5/2019 | Wang et al. | |
| 2020/0242920 A1 | 7/2020 | Pfadler et al. | |
| 2021/0041894 A1 | 2/2021 | Urano et al. | |
| 2022/0365530 A1 * | 11/2022 | Foster .................. | G05D 1/0022 |

(Continued)

FOREIGN PATENT DOCUMENTS

| | | |
|---|---|---|
| JP | 2018-077649 A | 5/2018 |
| JP | 2021-026696 A | 2/2021 |

*Primary Examiner* — Thomas E Worden
(74) *Attorney, Agent, or Firm* — Dinsmore & Shohl LLP

(57) ABSTRACT

A remote control request method has requesting, by a computer, a remote operator to perform remote control on an autonomous driving vehicle when the autonomous driving vehicle currently has or is expected to have difficulty in continuing autonomous driving, requesting remote assistance in which the remote operator makes at least a part of determination for the autonomous driving inside an autonomous driving domain, and requesting, outside the autonomous driving domain, remote driving in which the remote operator performs at least one of a steering operation and an acceleration or deceleration operation of the autonomous driving vehicle.

19 Claims, 12 Drawing Sheets

(56)  References Cited

U.S. PATENT DOCUMENTS

| | | | |
|---|---|---|---|
| 2022/0410894 A1* | 12/2022 | Foster | .................. G06V 20/588 |
| 2023/0305576 A1* | 9/2023 | Chase | .............. G08G 1/096758 |
| 2023/0376867 A1* | 11/2023 | Urano | .............. G06Q 10/06311 |
| 2025/0214617 A1* | 7/2025 | Gazepi | .............. B60W 60/0011 |

* cited by examiner

REMOTE CONTROL REQUEST SYSTEM, REMOTE CONTROL REQUEST METHOD, AND NONTRANSITORY STORAGE MEDIUM

CROSS-REFERENCE TO RELATED APPLICATION

This application claims priority to Japanese Patent Application No. 2021-096879 filed on Jun. 9, 2021, incorporated herein by reference in its entirety.

BACKGROUND

1. Technical Field

The present disclosure relates to a remote control request system, a remote control request method, and a non-transitory storage medium.

2. Description of Related Art

Japanese Unexamined Patent Application Publication No. 2018-077649 (JP 2018-077649 A) discloses a technology relating to remote control on an autonomous driving vehicle. According to this technology, when autonomous driving is difficult, communication is performed between the vehicle and a remote control management facility, and the vehicle is remotely driven by a remote operator.

SUMMARY

When autonomous driving is difficult, it is not always necessary to switch to remote driving. The autonomous driving may be continued by removing the cause of the difficulty. In addition, the number of remote operators who can handle remote driving is limited. Therefore, when the remote driving is always requested every time the autonomous driving is difficult, a great burden is placed on the remote operator.

The present disclosure provides a technology capable of reducing the burden on the remote operator while continuing the operation of the autonomous driving vehicle when the autonomous driving of the autonomous driving vehicle is difficult.

A first aspect of the present disclosure relates to a remote control request system including a remote control request device. The remote control request device includes a memory storing a program, and a processor connected to the memory. The processor is configured to request a remote operator to perform remote control on an autonomous driving vehicle when the autonomous driving vehicle currently has or is expected to have difficulty in continuing autonomous driving. The remote control has remote assistance in which the remote operator makes at least a part of determination for the autonomous driving, and remote driving in which the remote operator performs at least one of a steering operation and an acceleration or deceleration operation of the autonomous driving vehicle. The processor is configured to, during execution of the program, request the remote assistance inside an autonomous driving domain in which the autonomous driving is continuable by receiving the remote assistance, and request the remote driving outside the autonomous driving domain.

In the first aspect, the processor may be configured to request the remote assistance without requesting the remote driving inside the autonomous driving domain and a remote driving domain in which the remote driving is performable.

That is, in an area where both the remote assistance and the remote driving are performable, the remote assistance may have priority over the remote driving.

In the first aspect, the processor may be configured to determine whether the autonomous driving vehicle has difficulty in continuing the autonomous driving up to a predetermined period ahead or a predetermined distance ahead based on a route generated at least up to the predetermined period ahead or the predetermined distance ahead.

In the first aspect, the autonomous driving domain may have a preset domain.

In the first aspect, the autonomous driving domain may have a domain that changes with time.

In the first aspect, the processor may be configured to execute inside or outside determination on the autonomous driving domain based on external information and internal information acquired by the autonomous driving vehicle.

In the first aspect, the processor may be configured to request the remote driving outside the autonomous driving domain and inside a remote driving domain in which the remote driving is performable, and stop the autonomous driving vehicle or change a trajectory of the autonomous driving vehicle outside the autonomous driving domain and the remote driving domain.

In the first aspect, the remote driving domain may have a preset domain.

In the first aspect, the remote driving domain may have a domain that changes with time.

In the first aspect, the processor may be configured to execute inside or outside determination on the remote driving domain based on external information and internal information acquired by the autonomous driving vehicle.

In the first aspect, the remote control request system may include a server configured to connect to the remote control request device via a communication network. The remote control request device may be mounted on the autonomous driving vehicle. The remote control request device may be configured to cooperate with the server to request the remote assistance inside the autonomous driving domain in which the autonomous driving is continuable by receiving the remote assistance. The remote control request device may be configured to cooperate with the server to request the remote driving outside the autonomous driving domain.

In the first aspect, the remote control request device may be configured to transmit, to the server, first information held by the autonomous driving vehicle for inside or outside determination on the autonomous driving domain when the autonomous driving vehicle currently has or is expected to have difficulty in continuing the autonomous driving. The server may be configured to execute the inside or outside determination on the autonomous driving domain based on the first information transmitted from the remote control request device for the inside or outside determination on the autonomous driving domain and second information that affects the autonomous driving and is acquired by the server, and determine whether to request the remote assistance or the remote driving.

A second aspect of the present disclosure relates to a remote control request method. The remote control request method includes requesting, by a computer, a remote operator to perform remote control on an autonomous driving vehicle when the autonomous driving vehicle currently has or is expected to have difficulty in continuing autonomous driving, requesting remote assistance in which the remote operator makes at least a part of determination for the autonomous driving inside an autonomous driving domain, the autonomous driving being continuable by receiving the remote assistance in the autonomous driving domain, and requesting, outside the autonomous driving domain, remote driving in which the remote operator performs at least one of a steering operation and an acceleration or deceleration operation of the autonomous driving vehicle. The remote control has the remote assistance and the remote driving.

A third aspect of the present disclosure relates to a non-transitory storage medium storing a program that is executable by one or more processors and that causes the one or more processors to perform functions. The functions include requesting a remote operator to perform remote control on an autonomous driving vehicle when the autonomous driving vehicle currently has or is expected to have difficulty in continuing autonomous driving, requesting remote assistance in which the remote operator makes at least a part of determination for the autonomous driving inside an autonomous driving domain, the autonomous driving being continuable by receiving the remote assistance in the autonomous driving domain, and requesting, outside the autonomous driving domain, remote driving in which the remote operator performs at least one of a steering operation and an acceleration or deceleration operation of the autonomous driving vehicle. The remote control has the remote assistance and the remote driving.

According to the first aspect, the second aspect, and the third aspect of the present disclosure, when the autonomous driving vehicle currently has or is expected to have difficulty in continuing the autonomous driving, the remote operator is requested to perform the remote assistance inside the autonomous driving domain in which the autonomous driving is continuable by receiving the remote assistance. According to the remote assistance, the remote operator makes at least a part of the determination for the autonomous driving. Therefore, it is possible to continue the operation of the autonomous driving vehicle by the autonomous driving. The remote operator is requested to perform the remote driving outside the autonomous driving domain. According to the remote driving, the remote operator performs at least one of the steering operation and the acceleration or deceleration operation of the autonomous driving vehicle. Therefore, it is possible to continue the operation of the autonomous driving vehicle even in a situation in which the autonomous driving is difficult to continue. By selectively using the remote assistance and the remote driving as appropriate depending on situations when the autonomous driving vehicle has difficulty in the autonomous driving, the burden on the remote operator can be reduced while continuing the operation of the autonomous driving vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiments of the present disclosure will be described with reference to the drawings. Numerical values for each element that are mentioned in the following embodiments, such as the number, quantity, amount, and range of each element, are not intended to limit the technical ideas of the present disclosure to the mentioned numerical values unless otherwise specified or unless it is theoretically obvious that the technical ideas of the present disclosure are limited to the mentioned numerical values. Structures etc. that are described in the following embodiments are not necessarily essential to the technical ideas of the present disclosure unless otherwise specified or unless it is theoretically obvious that the structures etc. are essential to the technical ideas of the present disclosure.

1. Schematic Configuration of Remote Control System

Figure 1:
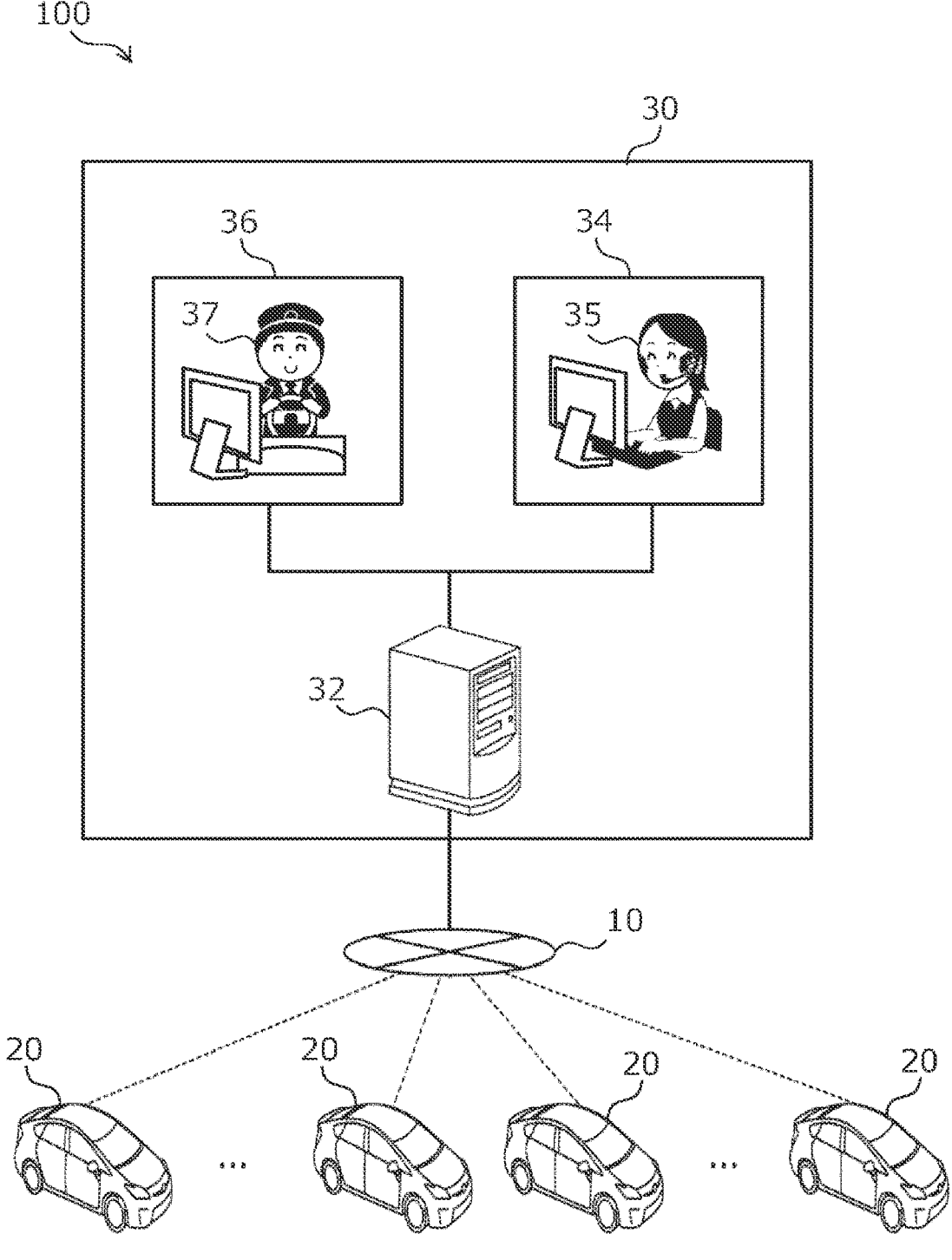
FIG. 1 is a diagram schematically showing the configuration of a remote control system.

FIG. 1 is a diagram schematically showing the configuration of a remote control system common to all the embodiments described later. A remote control system 100 is a system for remotely controlling autonomous driving vehicles 20 from a remote control center 30. Examples of autonomous driving levels of the autonomous driving vehicles 20 include Level 3, Level 4, and Level 5. The autonomous driving vehicle 20 is hereinafter referred to simply as "vehicle 20".

Remote control in the present disclosure includes remote assistance and remote driving. The remote assistance and the remote driving are performed when the vehicle 20 currently has or is expected to have difficulty in continuing autonomous driving. Examples of the case of difficulty in continuing autonomous driving include the following cases.

(1) When the vehicle 20 reaches an all-way stop intersection simultaneously with other vehicles, the vehicle 20 cannot determine when to enter the intersection and gets stuck.

(2) The vehicle 20 gets stuck because the vehicle 20 cannot determine whether a vehicle parked on a road shoulder is a vehicle parked on the road or waiting at the end of a queue of vehicles to enter a facility facing the road.

(3) The vehicle 20 gets stuck because the vehicle 20 cannot read an "atmosphere in which the other surrounding vehicles are yielding the right of way" when the vehicle 20 starts from a bus stop, joins at a junction, separates at a branch road, or changes a lane.

In the above cases, the vehicle 20 may continue to stop on the spot or may fail to reach a destination. Processes performed to avoid such situations are the remote assistance and the remote driving, which are performed by remote operators 35 and 37. The remote operator 35 who performs the remote assistance is hereinafter referred to as "remote assistant 35", and the remote operator 37 who performs the remote driving is hereinafter referred to as "remote driver 37".

In the remote assistance, the remote assistant 35 makes at least a part of determination for the autonomous driving of the vehicle 20. Basic calculations for recognition, determination, and operation required for driving are performed in the vehicle 20. The remote assistant 35 assists the vehicle 20 by determining an action to be taken by the vehicle 20 based on information transmitted from the vehicle 20. Details of the remote assistance provided by the remote assistant 35 to the vehicle 20 include a travel of the vehicle 20 and a stop of the vehicle 20. The details of the remote assistance may also include offset avoidance for an obstacle ahead, overtaking of a preceding vehicle, and emergency evacuation.

The "at least a part of determination" made by the remote assistant 35 is not limited to at least one determination on a plurality of determination factors. For example, a determination result may be obtained as a result of taking a plurality of steps below.

Step in which the remote assistant 35 presumes and understands a situation

Step in which the remote assistant 35 makes selection on a plurality of options

Step in which the remote assistant 35 evaluates a plurality of effective options Step in which the remote assistant 35 selects one of the evaluation results above the reference Alternatively, another process may be conceivable to obtain a determination result based on a step that is not included in the above steps. Examples of the step include a step of searching a database of past cases for statistical information. Therefore, the wording "at least a part of determination" may include contribution of the remote assistant 35 to at least one step for the vehicle 20 to obtain a desired determination result.

In the remote driving, the remote driver 37 drives the vehicle 20, specifically, performs at least a part of a steering operation or an acceleration or deceleration operation. In the remote driving, the recognition, determination, and operation required for driving are performed by the remote driver 37. The remote driver 37 drives the vehicle 20 from a remote location in the same manner as in a driver's seat of the vehicle 20. In the remote driving, the remote driver 37 need not always perform all the recognition, determination, and operation. At least a part of the recognition, determination, and operation may be assisted by functions of the vehicle 20.

A server 32, a remote assistance terminal 34, and a remote driving terminal 36 are installed in the remote control center 30. The vehicle 20 is connected to the server 32 via a communication network 10 including the fourth-generation mobile communication system (4G) and the fifth-generation mobile communication system (5G). The number of vehicles 20 communicable with the server 32 is one or more, preferably plural.

The remote assistance terminal 34 is an operation terminal to be operated by the remote assistant 35 for remote assistance. The remote driving terminal 36 is an operation terminal to be operated by the remote driver 37 for remote driving. At least one remote assistance terminal 34, preferably a plurality of remote assistance terminals 34, is provided. Similarly, at least one remote driving terminal 36, preferably a plurality of remote driving terminals 36, is provided. The remote control center 30 has as many remote assistants 35 as the remote assistance terminals 34. The remote control center 30 also has as many remote drivers 37 as the remote driving terminals 36. The remote operator 35 and the remote operator 37 may be different persons or may be the same person. The remote assistance terminal 34 and the remote driving terminal 36 may be different terminals or may be the same terminal capable of switching the remote assistance function and the remote driving function.

Each remote assistance terminal 34 and each remote driving terminal 36 are connected to the server 32 via a communication network including a local area network (LAN) and the Internet. The remote control center 30 need not be a real facility. The remote control center 30 is herein a system in which the remote assistance terminal 34 and the remote driving terminal 36 are connected to the server 32 via the communication network. Therefore, the server 32 may be installed on a cloud and the remote assistance terminal 34 and the remote driving terminal 36 may be installed in satellite offices at various places or in homes of the remote operators. The remote assistance terminal 34 and the remote driving terminal 36 may be connected to different servers. The remote assistance terminal 34 and the remote driving terminal 36 may be installed at different places.

Figure 2:
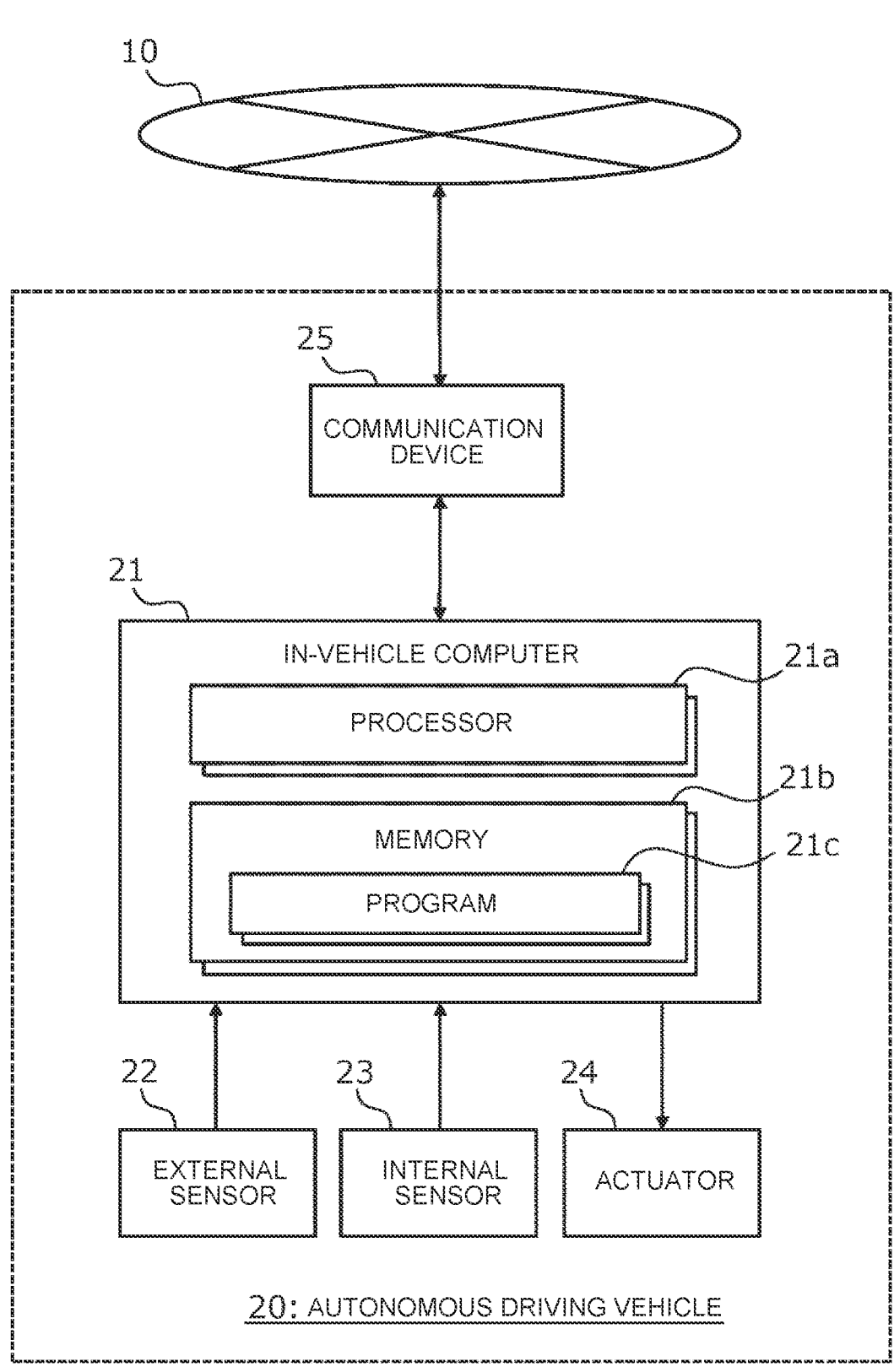
FIG. 2 is a block diagram showing an example of the configuration of an autonomous driving vehicle.

FIG. 2 is a block diagram showing an example of the configuration of the vehicle 20. The vehicle 20 includes an in-vehicle computer 21. The in-vehicle computer 21 is an aggregate of a plurality of electronic control units (ECUs) mounted on the vehicle 20. The vehicle 20 includes an external sensor 22, an internal sensor 23, an actuator 24, and a communication device 25. These devices are connected to the in-vehicle computer 21 by using an in-vehicle network such as a controller area network (CAN).

The in-vehicle computer 21 includes one or more processors 21a (hereinafter referred to simply as "processor 21a") and one or more memories 21b (hereinafter referred to simply as "memory 21b") coupled to the processors 21a. The memory 21b stores one or more programs 21c (hereinafter referred to simply as "program 21c") that can be executed by the processor 21a and various types of information related to the program 21c.

When the processor 21a executes the program 21c, various processes are implemented by the processor 21a. The program 21c includes, for example, a program for implementing autonomous driving, a program for implementing remote assistance, and a program for implementing remote driving. The program 21c includes a remote control request program that causes the in-vehicle computer 21 to function as a remote control request device described later. The memory 21b includes a main storage device and an auxiliary storage device. The program 21c can be stored in the main storage device or in a computer-readable recording medium serving as the auxiliary storage device. The auxiliary storage device may store a map database that manages map information for autonomous driving.

The external sensor 22 includes a camera that images a view around the vehicle 20, in particular, ahead of the vehicle 20. The camera may be a monocular camera or a stereo camera. A plurality of cameras may be provided to image views on the sides of and behind the vehicle 20 in addition to the view ahead of the vehicle 20. The camera may be shared between the autonomous driving and the remote control. Alternatively, cameras may be provided separately for the autonomous driving and for the remote control.

The external sensor 22 includes a recognition sensor other than a camera. The recognition sensor recognizes a situation around the vehicle 20. Examples of the recognition sensor other than the camera include a laser imaging, detection, and ranging (LiDAR) sensor and a millimeter wave radar. The external sensor 22 includes a position sensor that detects a position and an orientation of the vehicle 20. Examples of the position sensor include a Global Positioning System (GPS) sensor. Information obtained by the external sensor 22 is transmitted to the in-vehicle computer 21. The external sensor 22 may include a microphone that collects sounds around the vehicle 20.

The internal sensor 23 includes a condition sensor that acquires information about motion of the vehicle 20. Examples of the condition sensor include a wheel speed sensor, an acceleration sensor, an angular velocity sensor, and a steering angle sensor. The acceleration sensor and the angular velocity sensor may be an inertial measurement unit (IMU). Information obtained by the internal sensor 23 is transmitted to the in-vehicle computer 21. The information obtained by the internal sensor 23 is hereinafter referred to as "internal information", and the information obtained by the external sensor 22 is hereinafter referred to as "external information".

The actuator 24 includes a steering device that steers the vehicle 20, a drive device that drives the vehicle 20, and a braking device that brakes the vehicle 20. Examples of the steering device include a power steering system, a steer-by-wire steering system, and a rear wheel steering system. Examples of the drive device include an engine, a battery electric vehicle (BEV) system, and a hybrid system. Examples of the braking device include a hydraulic brake and a regenerative brake. The actuator 24 operates by a control signal transmitted from the in-vehicle computer 21.

The communication device 25 controls wireless communication with the outside of the vehicle 20. The communication device 25 communicates with the server 32 via the communication network 10. Information processed by the in-vehicle computer 21 is transmitted to the server 32 by using the communication device 25. Information processed by the server 32 is taken into the in-vehicle computer 21 by using the communication device 25. When vehicle-to-vehicle communication with other vehicles or road-to-vehicle communication with infrastructure facilities is required for autonomous driving, communication with these external devices is also performed by the communication device 25.

Figure 3:
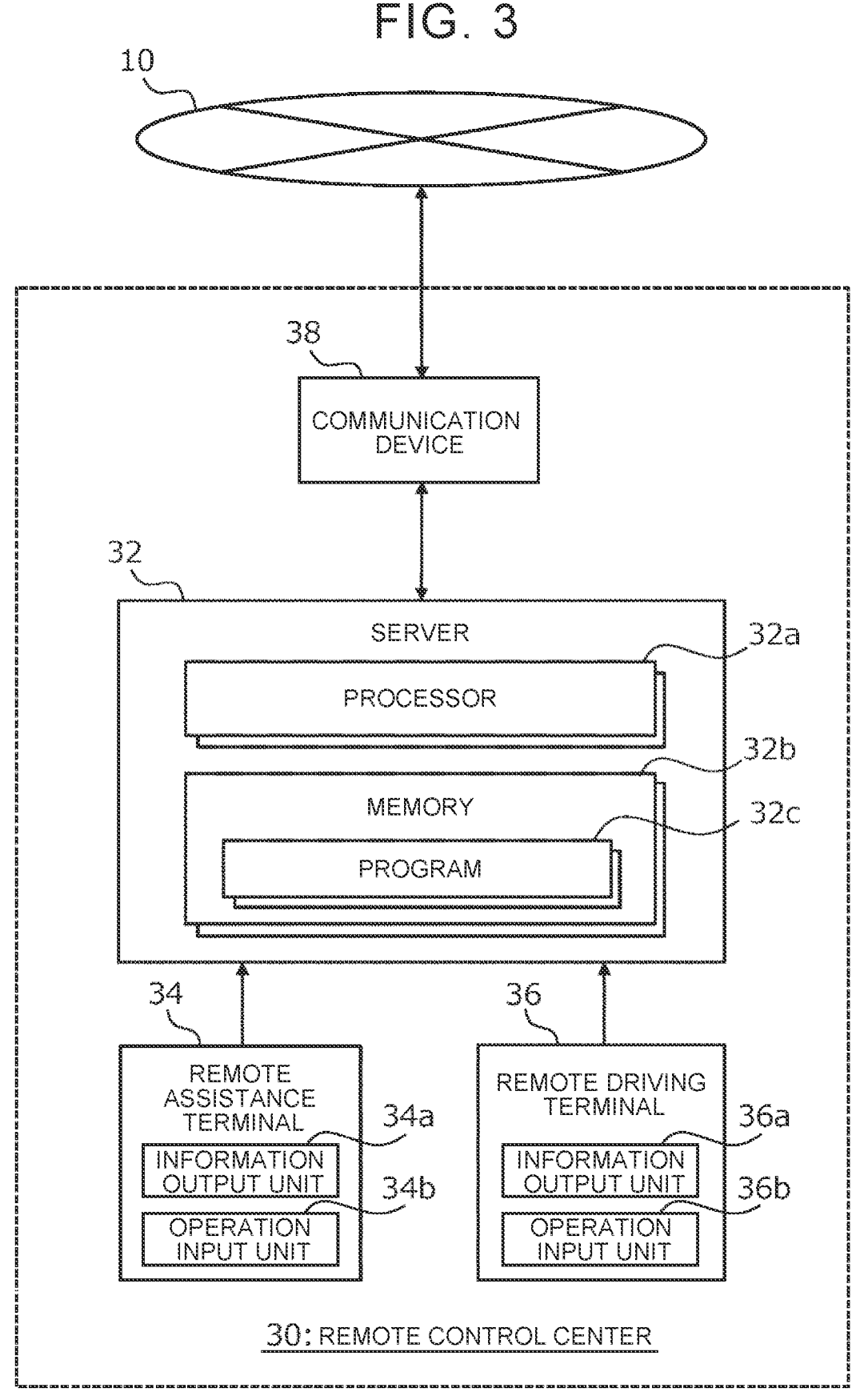
FIG. 3 is a block diagram showing an example of the configuration of a remote control center.

FIG. 3 is a block diagram showing an example of the configuration of the remote control center 30. The remote control center 30 includes the server 32. The server 32 is a single computer or an aggregate of a plurality of computers connected via a communication network. The remote control center 30 includes the remote assistance terminal 34, remote driving terminal 36, and a communication device 38. These devices are connected to the server 32 by using a communication network. As described above, a plurality of the remote assistance terminals 34 and a plurality of the remote driving terminals 36 may be connected to the server 32.

The server 32 includes one or more processors 32a (hereinafter referred to simply as "processor 32a") and one or more memories 32b (hereinafter referred to simply as "memory 32b") coupled to the processors 32a. The memory 32b stores one or more programs 32c (hereinafter referred to simply as "program 32c") that can be executed by the processor 32a and various types of information related to the program 32c.

When the processor 32a executes the program 32c, various processes are implemented by the processor 32a. The program 32c includes, for example, a program for implementing remote assistance and a program for implementing remote driving. The memory 32b includes a main storage device and an auxiliary storage device. The program 32c can be stored in the main storage device or in a computer-readable recording medium serving as the auxiliary storage device. The auxiliary storage device may store a map database that manages map information for autonomous driving. The map database may be stored in at least one of the server 32 and the in-vehicle computer 21.

The remote assistance terminal 34 includes an information output unit 34a. The information output unit 34a is a device that outputs information necessary for remote assistance for the vehicle 20 to the remote assistant 35. The information output unit 34a includes a display that outputs an image. The display displays, for example, an image ahead of the vehicle 20 that is captured by the camera of the vehicle 20. The display may have a plurality of display screens to display images of views on the sides of and/or behind the vehicle 20. The information output unit 34a may include a loudspeaker that outputs sound. The loudspeaker may output, for example, a sound or voice for information about the start or end of remote assistance. When the vehicle 20 includes a microphone, the loudspeaker may inform the remote assistant 35 about a situation around the vehicle 20 that is grasped by collecting sounds by the microphone.

The remote assistance terminal 34 includes an operation input unit 34b. The operation input unit 34b is a device for inputting an operation for remote assistance by the remote assistant 35. Specific examples of the input device include buttons, a lever, and a touch panel. For example, the vehicle 20 may be assisted in traveling, stopping, or laterally moving depending on a tilting direction of the lever. Examples of the lateral movement include offset avoidance for an obstacle ahead, lane change, and overtaking of a preceding vehicle.

The remote driving terminal 36 includes an information output unit 36a. The information output unit 36a is a device that outputs information necessary for remote driving of the vehicle 20 to the remote driver 37. The information output unit 36a includes a display that outputs an image. The display displays, for example, an image ahead of the vehicle 20 that is captured by the camera of the vehicle 20. As the display method, for example, the display may display the same view as the forward view from the driver's seat of the vehicle 20. The display may have a plurality of display screens to display images of views on the sides of and/or behind the vehicle 20. The information output unit 36a may include a loudspeaker that outputs sound. The loudspeaker may output, for example, a sound or voice for information about the start or end of remote driving. When the vehicle 20 includes a microphone, the loudspeaker may inform the remote driver 37 about a situation around the vehicle 20 that is grasped by collecting sounds by the microphone.

The remote driving terminal 36 includes an operation input unit 36*b*. The operation input unit 36*b* is a device for inputting an operation for remote driving by the remote driver 37. To simulate operations to be required when actually driving the vehicle 20, the operation input unit 36*b* includes a steering wheel for steering operation, an accelerator pedal for acceleration operation, and a brake pedal for deceleration operation. When the vehicle 20 includes a transmission, the operation input unit 36*b* may also include a lever or switch for the transmission. In addition, the operation input unit 36*b* includes devices for inputting operations necessary for safe driving, such as an operation lever for operating a turn signal of the vehicle 20 and an operation lever for operating a wiper.

The communication device 38 controls communication with the outside of the remote control center 30. The communication device 38 communicates with one or more vehicles 20 via the communication network 10. Information processed by the server 32 is transmitted to the vehicle 20 by using the communication device 38. Information processed by the vehicle 20 is taken into the server 32 by using the communication device 38.

2. Inside or Outside Determination on Autonomous Driving Domain and Inside or Outside Determination on Remote Driving Domain The autonomous driving of the vehicle 20 can be implemented by satisfying road conditions, geographical conditions, environmental conditions, hardware conditions, and various other conditions. A domain in which all the conditions for implementing the autonomous driving are satisfied is hereinafter referred to as "autonomous driving domain". When performing the autonomous driving, it is necessary to make determination as to whether the vehicle 20 is in the autonomous driving domain, that is, inside or outside determination on the autonomous driving domain.

The autonomous driving domain in the present disclosure is designed as a framework at a level equal to or higher than that of an operational design domain (ODD), which means driving environment conditions on which the autonomous driving system operates. For example, the general ODD framework is limited to expression of only the driving environment conditions, and the outside of the ODD means that "there is a cause outside the vehicle and the autonomous driving system does not operate normally". In the framework of the autonomous driving domain in the present disclosure, the outside of the autonomous driving domain may include such a situation that "there is a cause in the vehicle and the autonomous driving system does not operate normally". All the driving environment conditions that define the general ODD are parameters that can be expressed on a map. Therefore, the ODD can be considered to express an internal/external relationship with a vehicle of interest when grasped in terms of a positional relationship. The autonomous driving domain in the present disclosure may further include an internal/external relationship with the vehicle of interest when grasped on a time axis.

Both the remote assistance and the remote driving are remote control to be performed when the vehicle 20 currently has or is expected to have difficulty in continuing the autonomous driving. The remote assistance is an operation in which the remote assistant 35 makes a part of the determination for the autonomous driving to continue the autonomous driving. Therefore, it is a prerequisite for the remote assistance that the vehicle 20 is in the autonomous driving domain.

When the vehicle 20 is outside the autonomous driving domain, the autonomous driving cannot be performed and the remote assistance cannot be performed. In such a case, the remote driving is used as means for operating the vehicle 20. The remote driving can be implemented by satisfying road conditions, geographical conditions, environmental conditions, hardware conditions, and various other conditions. A domain in which all the conditions for implementing the remote driving are satisfied is hereinafter referred to as "remote driving domain". When performing the remote driving, it is necessary to make determination as to whether the vehicle 20 is in the remote driving domain, that is, inside or outside determination on the remote driving domain. The remote driving domain in the present disclosure is designed as a framework at a level equal to or higher than that of the ODD similarly to the autonomous driving domain.

Hereinafter, the inside or outside determination on the autonomous driving domain and the inside or outside determination on the remote driving domain will be described with reference to FIG. 4. For convenience of explanation using the figure, an autonomous driving domain ADD and a remote driving domain RDD are represented on a map together with a route RT on which the vehicle 20 travels.

Figure 4:
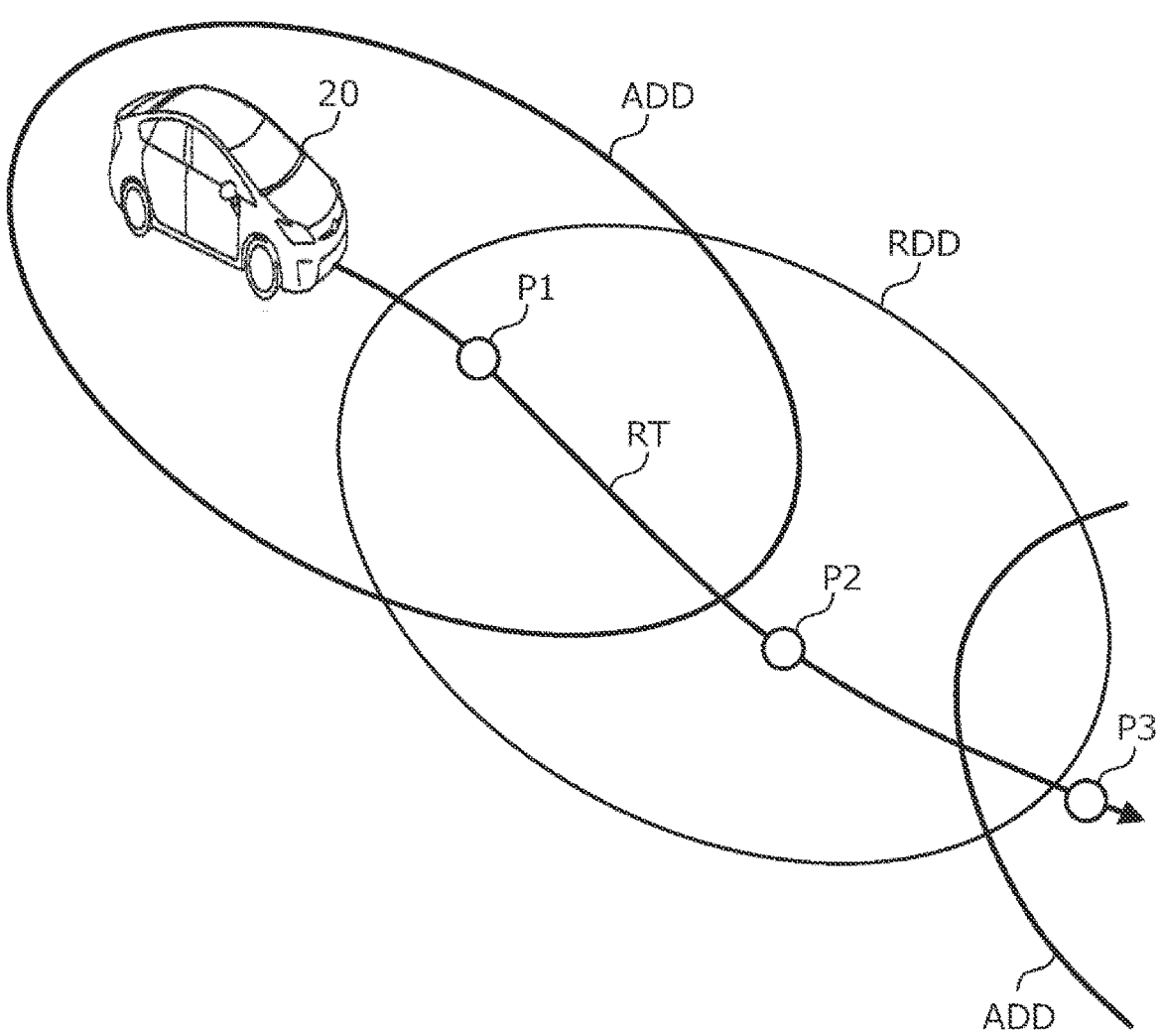
FIG. 4 is a conceptual diagram for explaining inside or outside determination on an autonomous driving domain and inside or outside determination on a remote driving domain.

According to the example shown in FIG. 4, the vehicle 20 is in the autonomous driving domain ADD at its current position. When the vehicle 20 travels along the route RT, the vehicle 20 at a point P1 is expected to enter the remote driving domain RDD while remaining in the autonomous driving domain ADD. At a point P2, the vehicle 20 is expected to exit the autonomous driving domain ADD but remain in the remote driving domain RDD. At a point P3, the vehicle 20 is expected to exit the remote driving domain RDD but enter the autonomous driving domain ADD again.

As described above, in the inside or outside determination on the autonomous driving domain ADD and the remote driving domain RDD, determination is made on an internal/external relationship between each of the autonomous driving domain ADD and the remote driving domain RDD and not only the current vehicle 20 but also the vehicle 20 in the future. In the determination on the internal/external relationship in the future, determination is made on an internal/external relationship between the vehicle 20 and each of the autonomous driving domain ADD and the remote driving domain RDD in terms of a positional relationship, and an internal/external relationship between the vehicle 20 and each of the autonomous driving domain ADD and the remote driving domain RDD in terms of a time axis. That is, determination is made as to whether the vehicle 20 is inside or outside the autonomous driving domain ADD at a future point or time and whether the vehicle 20 is inside or outside the remote driving domain RDD at a future point or time.

Hereinafter, description is given about examples of conditions for the autonomous driving domain ADD and the remote driving domain RDD and examples of criteria for the inside or outside determination.

CONDITION EXAMPLE 1

Road Conditions

Criterion Example 1-1

The upper limit vehicle speed of the vehicle 20 needs to cover the speed limit of a road where the vehicle 20 travels. For example, when the remote driving only supports a speed up to an upper limit of 30 km/h, the remote driving service cannot be provided on expressways. In this case, determination can be made that the expressways are outside the remote driving domain RDD.

Criterion Example 1-2

A lane change function is required to move to a destination that requires lane switching. For example, silent communication between drivers is important to get into a space between vehicles in a congested environment. However, such communication is difficult in the autonomous driving. Therefore, determination can be made that such an environment is outside the autonomous driving domain ADD.

Criterion Example 1-3

When the autonomous driving is performed with the aid of road markings, determination can be made that, for example, an unpaved riverside is outside the autonomous driving domain ADD.

Condition Example 2

Geographical Conditions

Criterion Example 2-1

Communication with the server 32 is required to implement the remote driving. Therefore, determination can be made that a mountainous area beyond the reach of radio waves is outside the remote driving domain RDD.

Criterion Example 2-2

In a land with no map created and a land with a large deviation from a map due to construction work, the autonomous driving service for autonomously driving the vehicle 20 with the aid of map information cannot be provided. That is, determination can be made that the land with no available map information is outside the autonomous driving domain ADD.

Condition Example 3

Environmental Conditions

Criterion Example 3-1

The autonomous driving is executed based on distance measurement information obtained by the LiDAR sensor, but light for use in LiDAR is scattered under rain or fog. Therefore, determination can be made that the rainy or foggy environment is outside the autonomous driving domain ADD.

Criterion Example 3-2

When the vehicle 20 includes a low-sensitivity camera, an external image cannot be captured in a tunnel or at night. When such a camera image is used for the remote driving, determination can be made that the area in the tunnel or the nighttime is outside the remote driving domain RDD.

Condition Example 4

Hardware Conditions

Criterion Example 4-1

When the hardware used only for the autonomous driving is performing a desired operation or returning a desired output, determination can be made that the hardware is in the autonomous driving domain ADD. For example, when the LiDAR sensor is the hardware used only for the autonomous driving and is performing a desired operation or returning a desired output, determination can be made that the LiDAR sensor is in the autonomous driving domain ADD. When the hardware used only for the remote driving is performing a desired operation or returning a desired output, determination can be made that the hardware is in the remote driving domain RDD. Examples of the hardware herein include a calculation device and a sensor.

Criterion Example 4-2

It is conceivable to predict the sensor operation at a future location and time based on map information, weather information, or the like and estimate the autonomous driving domain ADD and the remote driving domain RDD from the present to the future. For example, rain adversely affects the use of the LiDAR sensor. Therefore, when a location where a heavy shower is occurring is known based on the weather information, determination can be made that the time to reach that location is outside the autonomous driving domain ADD.

Criterion Example 4-3

When the camera used for the remote driving is susceptible to backlight and the location and time when a signal cannot be recognized due to backlight can be predicted based on the direction of the vehicle 20 and the direction of the sun, determination can be made that the location and the time are outside the remote driving domain RDD.

Criterion Example 4-4

When the autonomous driving is performed by using a sensor mounted at a low position where the sensor is affected by mud splash, determination can be made that rainy weather is outside the autonomous driving domain ADD. When the autonomous driving is performed by using a sensor mounted on a top position of the vehicle 20, determination can be made that a travel in a land with deciduous trees is outside the autonomous driving domain ADD.

Criterion Example 4-5

When a GPS antenna is used, a location unfavorable to the GPS can be predicted from the number of satellites based on the point and time. When the autonomous driving is performed by using the GPS, determination can be made that the predicted location unfavorable to the GPS is outside the autonomous driving domain ADD.

Condition Example 5

Software Conditions

Criterion Example 5-1

Most software products used in the autonomous or remote driving are independent and indispensable. The software may be frozen even if the software is operating. Various symptoms may occur. There are many symptoms such as failure in an appropriate output due to a huge amount of calculation, a decrease in a calculation speed due to thermal runaway, and failure in recovery from an inappropriate error due to a bug. Therefore, it is necessary to periodically communicate with the software to check whether a desired output is made, thereby checking the health of the software. For example, when a route planning module can calculate a route to be followed in the future, determination can be made that the route planning module is in the autonomous driving domain ADD.

Criterion Example 5-2

In the autonomous driving, self-position estimation is performed. In the self-position estimation, the likelihood, that is, reliability of an estimation result can be calculated based on variance or distribution. When the reliability is equal to or higher than a threshold, determination can be made that the reliability is in the autonomous driving domain ADD.

Condition Example 6

Other Conditions

Criterion Example 6-1

When each municipality has its own regulations, functions that do not meet those regulations cannot be used. For example, when the use of remote driving is prohibited in a certain municipality, the inside of the municipality is outside the remote driving domain RDD.

As in the above condition examples, the autonomous driving domain ADD includes preset domains and also includes domains that change with time. The inside or outside determination on the autonomous driving domain ADD is executed based on the external information and the internal information acquired by the external sensor 22 and the internal sensor 23. Similarly, the remote driving domain RDD includes preset domains and also includes domains that change with time. The inside or outside determination on the remote driving domain RDD is executed based on the external information and the internal information acquired by the external sensor 22 and the internal sensor 23.

3. Remote Control Request Method of First Embodiment

Figure 5:
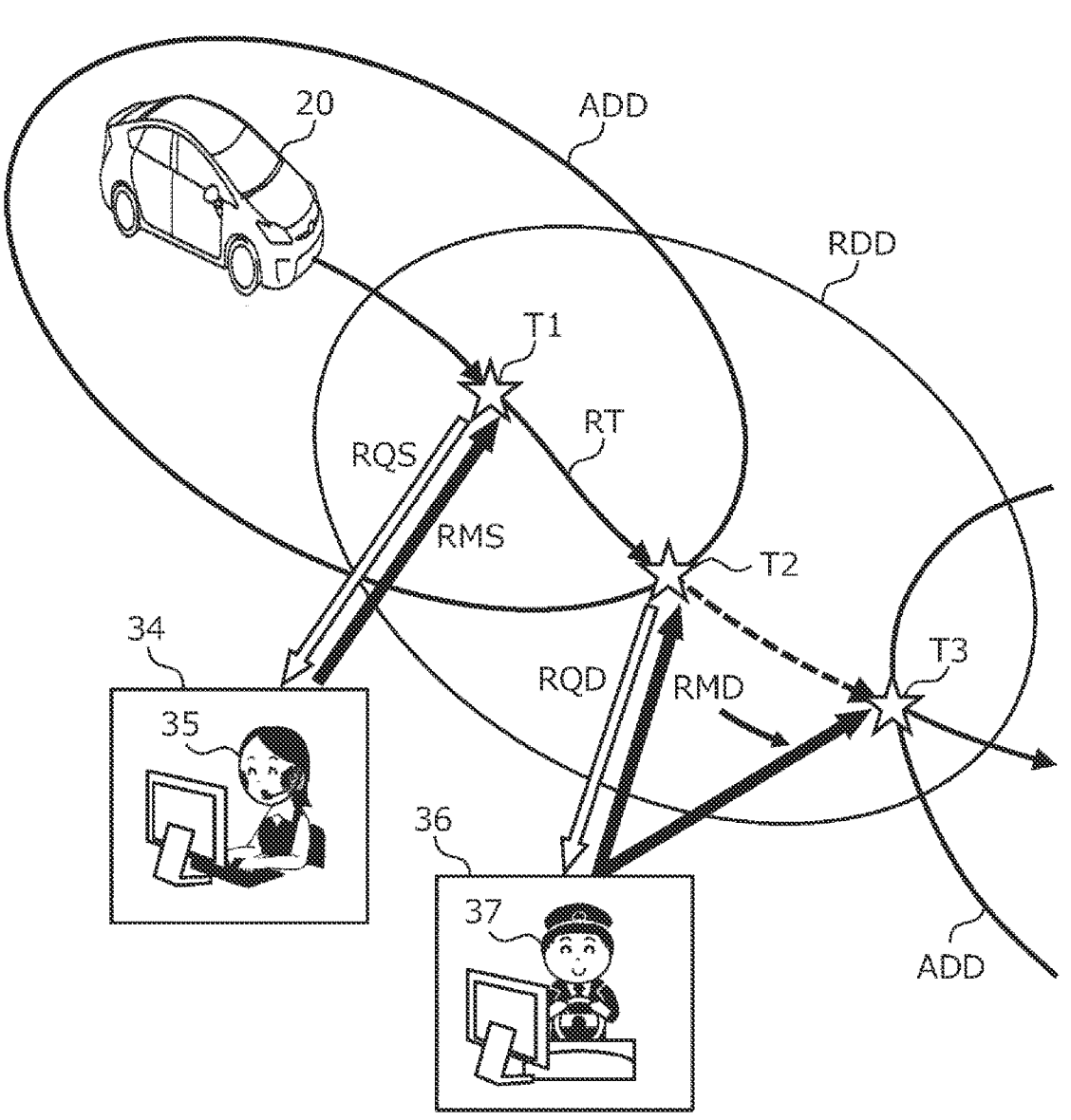
FIG. 5 is a conceptual diagram for explaining an outline of a remote control request method according to a first embodiment of the present disclosure.
Figure 6:
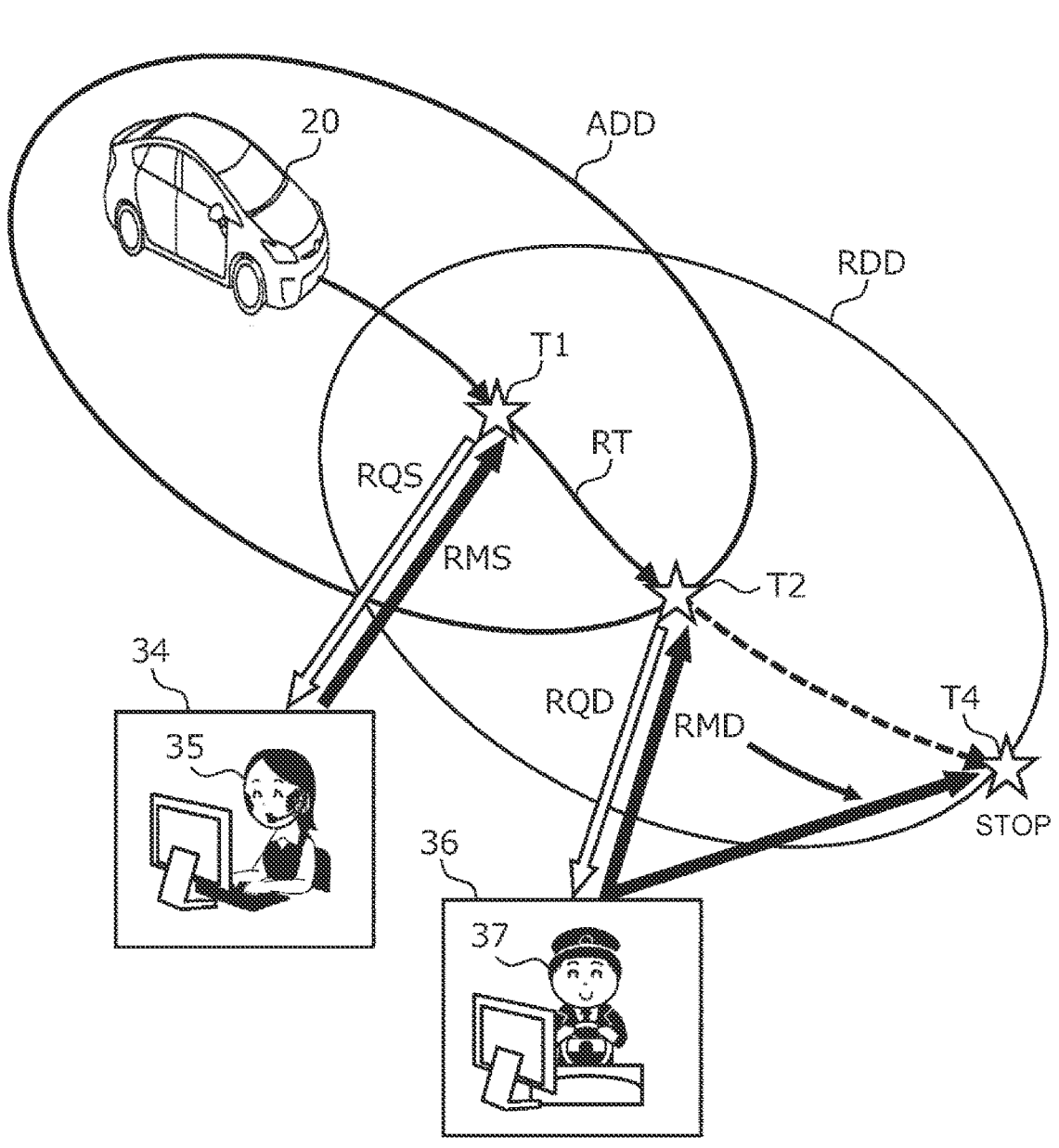
FIG. 6 is a conceptual diagram for explaining the outline of the remote control request method according to the first embodiment of the present disclosure.

FIGS. 5 and 6 are conceptual diagrams for explaining an outline of a remote control request method according to a first embodiment of the present disclosure. Hereinafter, the remote control request method according to the first embodiment will be described with reference to these figures.

In the example shown in FIG. 5, the vehicle 20 is currently in the autonomous driving domain ADD and is autonomously driven along a route RT generated up to a predetermined period ahead. When the vehicle 20 moves along the route RT, the vehicle 20 enters an area within the autonomous driving domain ADD and within the remote driving domain RDD. The remote driving is possible in this area, but the autonomous driving is prioritized. Since the remote driver 37 is required to have the same high skill as in a case of actually driving the vehicle 20, reduction of a burden on the remote driver 37 is one of the reasons for giving priority to the autonomous driving.

It is assumed that the vehicle 20 has difficulty in continuing the autonomous driving at a time T1. Alternatively, the vehicle 20 is expected to have difficulty in continuing the autonomous driving. Since the vehicle 20 is in the autonomous driving domain ADD at the time T1, the autonomous driving can be continued by receiving remote assistance. As an example, it may be assumed that the vehicle 20 turns right at an intersection where there is no right turn instruction by a traffic light. In this case, the vehicle 20 can turn right at the intersection and continue the autonomous driving when a person makes a right turn determination on behalf of the vehicle 20.

In the first embodiment, the vehicle 20 makes the inside or outside determination on the autonomous driving domain ADD and the inside or outside determination on the remote driving domain RDD. At the time T1, the vehicle 20 transmits a remote assistance request RQS to the remote assistant 35. The remote assistant 35 who has received the remote assistance request RQS operates the remote assistance terminal 34 based on information transmitted from the vehicle 20, such as a camera image. An operation signal RMS for remotely assisting the vehicle 20 is transmitted from the remote assistance terminal 34 to the vehicle 20. By being remotely assisted by the operation signal RMS, the vehicle 20 can continue the autonomous driving again.

When the vehicle 20 moves along the route RT, the vehicle 20 exits the autonomous driving domain ADD at a time T2. By exiting the autonomous driving domain ADD, the vehicle 20 has difficulty in continuing the autonomous driving. In this case, the vehicle 20 exits the autonomous driving domain ADD but is in the remote driving domain RDD. Therefore, the operation of the vehicle 20 can be continued by switching the autonomous driving to the remote driving. At the time T2, the vehicle 20 transmits a remote driving request RQD to the remote driver 37. The remote driver 37 who has received the remote driving request RQD operates the remote driving terminal 36 based on information transmitted from the vehicle 20, such as a camera image. An operation signal RMD for remotely driving the vehicle 20 is transmitted from the remote driving terminal 36 to the vehicle 20. The remote driving by the operation signal RMD is continued until the vehicle 20 enters the autonomous driving domain ADD again while remaining in the remote driving domain RDD.

When the vehicle 20 moves along the route RT, the vehicle 20 enters the autonomous driving domain ADD again at a time T3. By entering the autonomous driving domain ADD, the vehicle 20 can resume the autonomous driving. In this case, the remote driving is stopped and switched to the autonomous driving of the vehicle 20. In such an area where the autonomous driving is possible, the burden on the remote driver 37 can be reduced by giving priority to the autonomous driving over the remote driving.

In the example shown in FIG. 6, when the vehicle 20 that has started the remote driving at the time T2 moves along the route RT, the vehicle 20 exits the remote driving domain RDD at a time T4. When the vehicle 20 exits the remote driving domain RDD, the remote driver 37 cannot continue the remote driving. The remote driving cannot be switched to the autonomous driving because the vehicle 20 is not in the autonomous driving domain ADD at the time T4. In this case, the vehicle 20 decelerates and stops on the spot to ensure safety. Alternatively, the trajectory of the vehicle 20 may be changed to stop the vehicle 20 at a safe place such as a road shoulder.

At the stage of determination of the route RT, selection may be made for a route in which the autonomous driving domain ADD or the remote driving domain RDD continues to the destination, that is, a route in which the autonomous driving or the remote driving continues to the destination. When there is a plurality of candidates for the route RT, selection may be made for a route in which the autonomous driving domain ADD continues for a longer period. Since the time when the autonomous driving domain ADD and the remote driving domain RDD are switched (for example, the time T2) can be calculated, selection may be made for a route in which the time of switching agrees with times when the remote assistant 35 and the remote driver 37 can operate. For example, it is assumed that the time when the remote assistant 35 can operate (end time of work) is up to a time T5 and the time when the remote driver 37 can operate (start time of work) is after the time T5. In this case, a route in which the autonomous driving domain ADD is switched to the remote driving domain RDD at the time T5 or a route in which both the autonomous driving domain ADD and the remote driving domain RDD are present at the time T5 may be selected from among the candidates for the route RT.

4. Configuration of Remote Control System of First Embodiment

Figure 7:
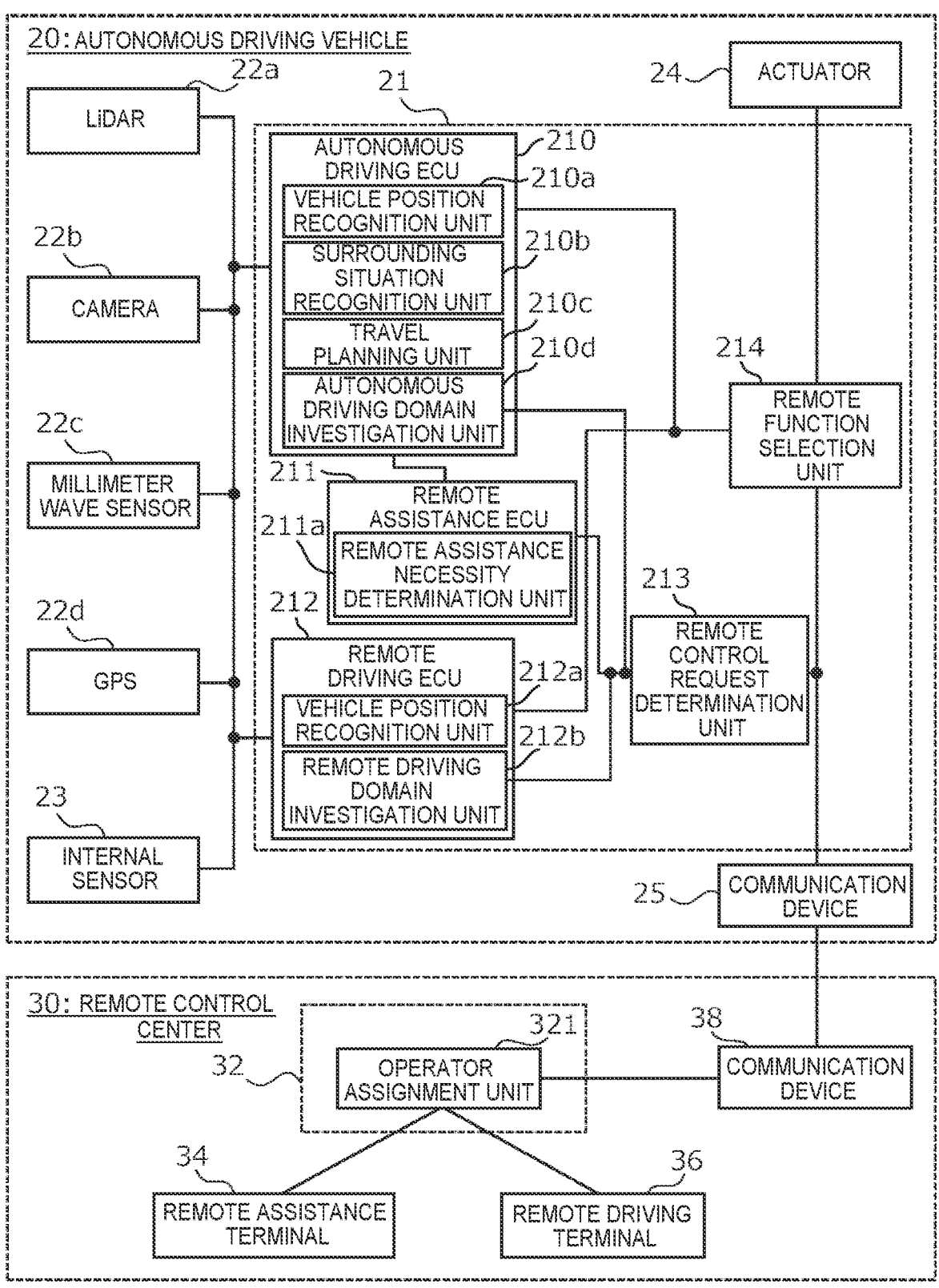
FIG. 7 is a block diagram showing the configuration of a remote control system according to the first embodiment of the present disclosure.

The remote control request method can be implemented by a remote control system according to the first embodiment with a configuration shown in FIG. 7. In FIG. 7, functions of the in-vehicle computer 21 and functions of the server 32 are represented by blocks. Hereinafter, the remote control system according to the first embodiment will be described focusing on the functions of the in-vehicle computer 21 and the server 32. Description will be omitted or simplified for the components and functions already described above. FIG. 7 illustrates a LiDAR sensor 22a, a camera 22b, a millimeter wave sensor 22c, and a GPS receiver 22d as the external sensor 22.

The in-vehicle computer 21 includes an autonomous driving ECU 210, a remote assistance ECU 211, a remote driving ECU 212, a remote control request determination unit 213, and a remote function selection unit 214. The remote control request determination unit 213 and the remote function selection unit 214 may be independent ECUs or may be functions of one ECU. Signals including external information and internal information are input to the autonomous driving ECU 210 and the remote driving ECU 212 from the LiDAR sensor 22a, the camera 22b, the millimeter wave sensor 22c, the GPS receiver 22d, and the internal sensor 23. All the signals need not be input to both the ECUs 210 and 212. For example, the input of the signal from the LiDAR sensor 22a to the remote driving ECU 212 may be omitted.

The autonomous driving ECU 210 includes a vehicle position recognition unit 210a, a surrounding situation recognition unit 210b, a travel planning unit 210c, and an autonomous driving domain investigation unit 210d. These units are implemented as functions of the autonomous driving ECU 210 when a program stored in the memory of the autonomous driving ECU 210 is executed by the processor.

The vehicle position recognition unit 210a recognizes the position of the vehicle 20 on a map based on position information of the vehicle 20 that is received by the GPS receiver 22d, information on motion of the vehicle 20 that is detected by the internal sensor 23, and the map information obtained from the map database. The vehicle position recognition unit 210a can estimate the position of the vehicle 20 based on a relative position of a feature detected by the LiDAR sensor 22a, the camera 22b, or the millimeter wave sensor 22c with respect to the vehicle 20, the information on the motion of the vehicle 20 that is detected by the internal sensor 23, and a position of the detected feature on the map.

The surrounding situation recognition unit 210b recognizes an object around the vehicle 20 and determines the position and type of the object by using a technique such as pattern matching or deep learning for information received from the LiDAR sensor 22a, the camera 22b, or the millimeter wave sensor 22c. Examples of the target object recognized by the surrounding situation recognition unit 210b include a moving object such as a vehicle, a motorcycle, a bicycle, and a pedestrian, and a stationary object. The surrounding situation recognition unit 210b outputs, as a target, the object whose position and type have been determined.

The travel planning unit 210c creates a travel plan for the vehicle 20 based on, for example, the route RT recorded in the map database and target information obtained by the surrounding situation recognition unit 210b. The travel plan is created so that the vehicle 20 appropriately travels on the route RT in light of criteria such as safety, legal compliance, and travel efficiency. The travel planning unit 210c generates a target trajectory based on the created travel plan. The target trajectory includes a set of target positions of the vehicle 20 in a coordinate system fixed to the vehicle 20 and target speeds at individual target points. The autonomous driving ECU 210 calculates an actuator control amount for causing the vehicle 20 to follow the target trajectory generated by the travel planning unit 210c.

The autonomous driving domain investigation unit 210d executes the inside or outside determination on the autonomous driving domain ADD in accordance with predetermined determination criteria as in the criterion examples in the condition examples described above. The determination result of the inside or outside determination on the autonomous driving domain ADD is input to the remote control request determination unit 213 in the subsequent stage.

The remote assistance ECU 211 includes a remote assistance necessity determination unit 211a. The remote assistance necessity determination unit 211a is implemented as a function of the remote assistance ECU 211 when a program stored in the memory of the remote assistance ECU 211 is executed by the processor. The remote assistance ECU 211 communicates with the autonomous driving ECU 210 and acquires, from the autonomous driving ECU 210, information necessary for determining the necessity of the remote assistance.

The remote assistance necessity determination unit 211a determines, based on the information from the autonomous driving ECU, whether the vehicle 20 has difficulty in continuing the autonomous driving, or whether the vehicle 20 is expected to have difficulty in continuing the autonomous driving. Next, the remote assistance necessity determination unit 211a determines whether to request the remote assistance based on a determination result about the difficulty in continuing the autonomous driving and the determination result of the inside or outside determination on the autonomous driving domain ADD from the autonomous driving ECU. The determination result from the remote assistance necessity determination unit 211a is input to the remote control request determination unit 213 in the subsequent stage.

The remote driving ECU 212 includes a vehicle position recognition unit 212a and a remote driving domain investigation unit 212b. These units are implemented as functions of the remote driving ECU 212 when a program stored in the memory of the remote driving ECU 212 is executed by the processor.

The vehicle position recognition unit 212a has the same function as that of the vehicle position recognition unit 210a of the autonomous driving ECU 210. That is, the vehicle position recognition unit 212a recognizes the position of the vehicle 20 on the map. In the example shown in FIG. 7, the autonomous driving ECU 210 and the remote driving ECU 212 separately recognize the position of the vehicle 20, but another independent ECU may recognize the position of the vehicle 20 and the autonomous driving ECU 210 and the remote driving ECU 212 may acquire the recognition result.

The remote driving domain investigation unit 212b executes the inside or outside determination on the remote driving domain RDD in accordance with predetermined determination criteria as in the criterion examples in the condition examples described above. The determination result of the inside or outside determination on the remote driving domain RDD is input to the remote control request determination unit 213 in the subsequent stage.

The remote control request determination unit 213 determines whether to request the remote control based on the determination result of the inside or outside determination on the autonomous driving domain ADD, the determination result about the necessity of the remote assistance, and the determination result of the inside or outside determination on the remote driving domain RDD. When requesting the remote control, the remote control request determination unit 213 determines which of the remote assistance and the remote driving to request. The determination result from the remote control request determination unit 213 is input to the remote function selection unit 214 and the communication device 25 in the subsequent stage.

The remote function selection unit 214 transmits a control signal to the actuator 24 based on the determination result from the remote control request determination unit 213. Specifically, when the autonomous driving is continued without the remote control, the actuator control amount calculated by the autonomous driving ECU 210 is transmitted to the actuator 24 as the control signal. When the remote control is selected, the actuator control amount calculated by the autonomous driving ECU 210 and a remote assistance signal (for example, a Go signal or a No-Go signal) transmitted from the remote control center 30 are transmitted to the actuator 24 as the control signal. When the remote driving is selected, a remote driving signal transmitted from the remote control center 30 (for example, a signal including an actuator control amount for the remote driving) is transmitted to the actuator 24 as the control signal.

The determination result input from the remote control request determination unit 213 to the communication device 25 is transmitted from the communication device 25 to the communication device 38 of the remote control center 30. The determination result is transmitted only when determination is made to request any remote control out of the remote assistance and the remote driving. When the determination result is transmitted, the request for the remote assistance or the remote driving from the in-vehicle computer 21 to the remote control center 30 is completed. As described above, the in-vehicle computer 21 according to the first embodiment functions as the remote control request device that requests the remote assistant 35 or the remote driver 37 to remotely control the vehicle 20.

The determination result received by the communication device 38 from the remote control request determination unit 213 is input to the server 32. The server 32 includes an operator assignment unit 321. The operator assignment unit 321 is implemented as a function of the server 32 when a program stored in the memory of the server 32 is executed by the processor.

The operator assignment unit 321 assigns the remote control request from the vehicle 20 to an appropriate remote operator based on the determination result from the remote control request determination unit 213. When the remote control request is a remote assistance request, the request is transmitted to the remote assistance terminal 34. The operator assignment unit 321 transmits, to the remote assistance terminal 34, information necessary for the remote assistance that is acquired from the vehicle 20. A remote assistance signal input by the remote assistant 35 is transmitted from the remote assistance terminal 34 to the operator assignment unit 321.

When the remote control request is a remote driving request, the request is transmitted to the remote driving terminal 36. The operator assignment unit 321 transmits, to the remote driving terminal 36, information necessary for the remote driving that is acquired from the vehicle 20. A remote driving signal input by the remote driver 37 is transmitted from the remote driving terminal 36 to the operator assignment unit 321.

The signal transmitted from the remote assistance terminal 34 or the remote driving terminal 36 to the operator assignment unit 321 is transmitted from the operator assignment unit 321 to the vehicle 20 via the communication device 38. The remote assistance signal or the remote driving signal transmitted from the remote control center 30 to the vehicle 20 is transmitted from the communication device 25 to the remote function selection unit 214 of the in-vehicle computer 21.

5. Remote Control Request Method of Second Embodiment

Next, a remote control request method according to a second embodiment of the present disclosure will be described with reference to FIG. 8. In the remote control request method according to the first embodiment, when the vehicle 20 currently has or is expected to have difficulty in continuing the autonomous driving, the in-vehicle computer 21 of the vehicle 20 determines which of the remote assistance and the remote driving to request. In the remote control request method according to the second embodiment, the server 32 executes this determination.

Figure 8:
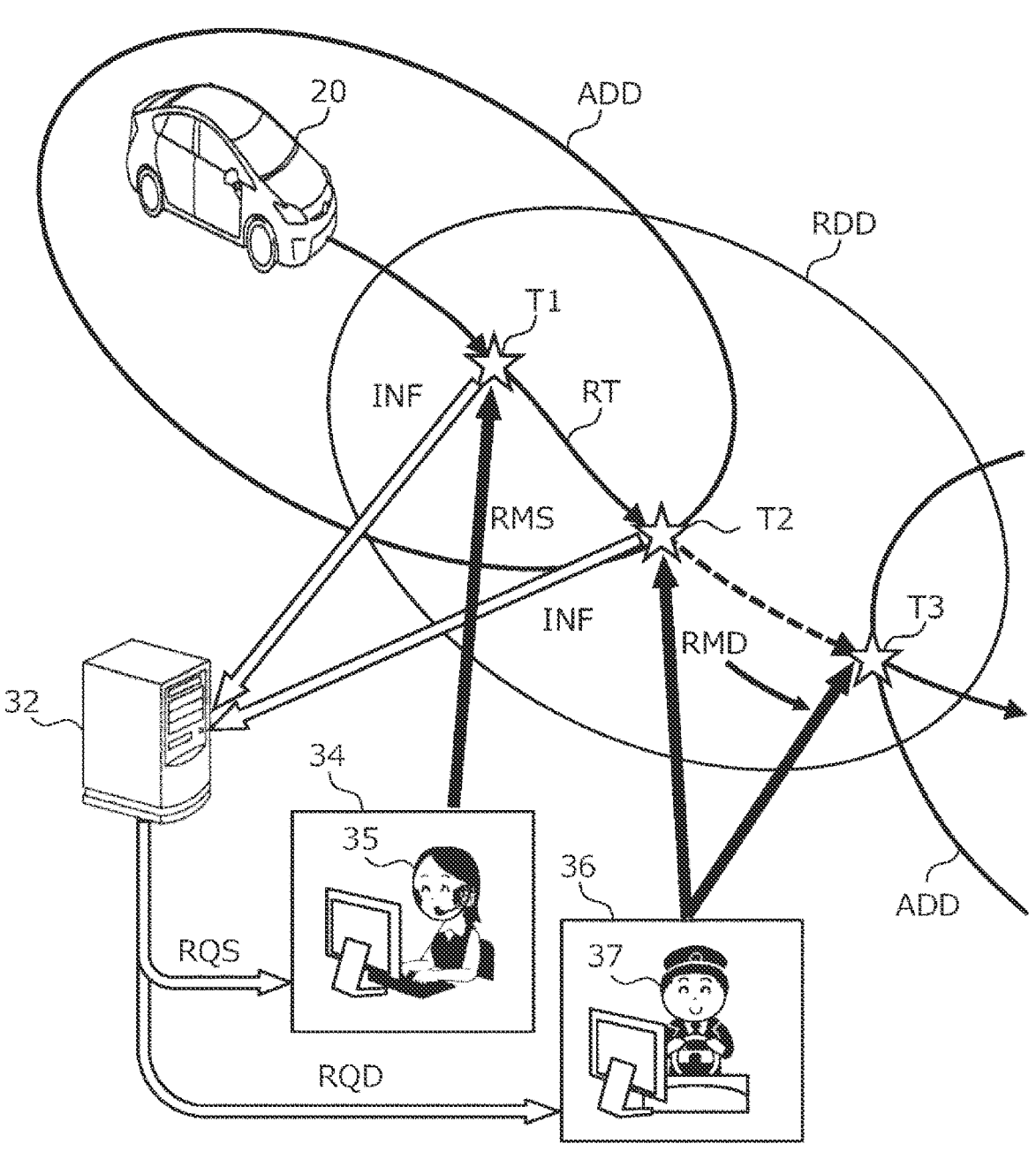
FIG. 8 is a conceptual diagram for explaining an outline of a remote control request method according to a second embodiment of the present disclosure.

In the example shown in FIG. 8, when the vehicle 20 has difficulty in continuing the autonomous driving at the time T1, information INF necessary for determining the remote control method is transmitted from the vehicle 20 to the server 32. The information INF transmitted to the server 32 includes an initial determination result of the inside or outside determination on the autonomous driving domain ADD and an initial determination result of the inside or outside determination on the remote driving domain RDD from the in-vehicle computer 21.

The server 32 determines whether to request the remote control based on the information transmitted from the vehicle 20. When requesting the remote control, the server 32 determines which of the remote assistance and the remote driving to request. The server 32 can acquire information that the vehicle 20 does not have, in particular, information that affects the autonomous driving and information that affects the remote driving. The server 32 executes inside or outside determination on the autonomous driving domain ADD and inside or outside determination on the remote driving domain RDD and determines which of the remote assistance and the remote driving to request based on the information acquired from the vehicle 20 and the information independently acquired by the server 32.

At the time T1, the server 32 transmits the remote assistance request RQS to the remote assistant 35. The remote assistant 35 who has received the remote assistance request RQS operates the remote assistance terminal 34 based on information transmitted from the vehicle 20, such as a camera image. The operation signal RMS for remotely assisting the vehicle 20 is transmitted from the remote assistance terminal 34 to the vehicle 20. By being remotely assisted by the operation signal RMS, the vehicle 20 can continue the autonomous driving again.

When the vehicle 20 moves along the route RT, the vehicle 20 exits the autonomous driving domain ADD at the time T2. By exiting the autonomous driving domain ADD, the vehicle 20 has difficulty in continuing the autonomous driving. In this case, the vehicle 20 retransmits the information INF necessary for determining the remote control method to the server 32. Similarly to the time T1, the server 32 executes the inside or outside determination on the autonomous driving domain ADD and the inside or outside determination on the remote driving domain RDD and determines which of the remote assistance and the remote driving to request based on the information acquired from the vehicle 20 and the information independently acquired by the server 32.

At the time T2, the server 32 transmits the remote driving request RQD to the remote driver 37. The remote driver 37 who has received the remote driving request RQD operates the remote driving terminal 36 based on information transmitted from the vehicle 20, such as a camera image. The operation signal RMD for remotely driving the vehicle 20 is transmitted from the remote driving terminal 36 to the vehicle 20. The remote driving by the operation signal RMD is continued until the vehicle 20 enters the autonomous driving domain ADD again while remaining in the remote driving domain RDD.

6. Configuration of Remote Control System of Second Embodiment

Figure 9:
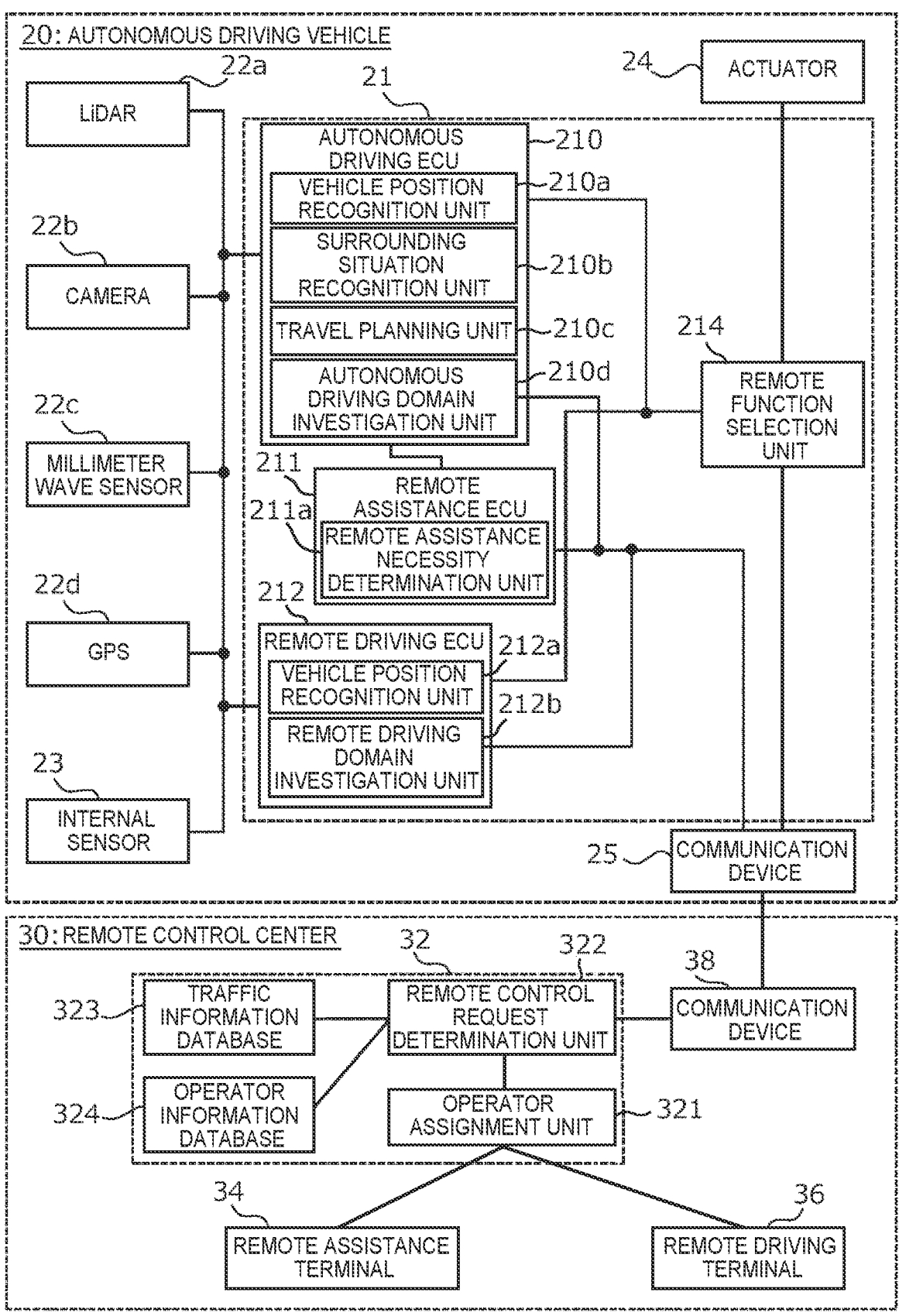
FIG. 9 is a block diagram showing the configuration of a remote control system according to the second embodiment of the present disclosure.

The remote control request method can be implemented by a remote control system according to the second embodiment with a configuration shown in FIG. 9. In FIG. 9, functions of the in-vehicle computer 21 and functions of the server 32 are represented by blocks. Hereinafter, the remote control system according to the second embodiment will be described focusing on the functions of the in-vehicle computer 21 and the server 32. Description will be omitted or simplified for the components and functions already described above.

The main difference between the remote control system according to the first embodiment and the remote control system according to the second embodiment is that the function of the remote control request determination unit is transferred from the in-vehicle computer 21 to the server 32. Therefore, the determination result of the inside or outside determination on the autonomous driving domain ADD, the determination result about the necessity of the remote assistance, and the determination result of the inside or outside determination on the remote driving domain RDD that are input to the remote control request determination unit in the in-vehicle computer 21 are transmitted to the server 32 of the remote control center 30 via the communication device 25.

The determination results transmitted from the in-vehicle computer 21 to the server 32 are used as initial determination results, and the final determination is made by the server 32. In the remote control system according to the second embodiment, the server 32 includes the operator assignment unit 321, a remote control request determination unit 322, a traffic information database 323, and an operator information database 324. The operator assignment unit 321 and the remote control request determination unit 322 are implemented as functions of the server 32 when a program stored in the memory of the server 32 is executed by the processor. The traffic information database 323 and the operator information database 324 are stored in the auxiliary storage device of the server 32.

The remote control request determination unit 322 comprehensively determines whether to request the remote control based on the initial determination results transmitted from the in-vehicle computer 21 and the information held only by the server 32. The information held only by the server 32 includes traffic information registered in the traffic information database 323 and operator information registered in the operator information database 324. When requesting the remote control, the remote control request determination unit 322 comprehensively determines which of the remote assistance and the remote driving to request based on the information acquired from the in-vehicle computer 21 and the information held only by the server 32. The determination result from the remote control request determination unit 322 is input to the operator assignment unit 321 in the subsequent stage.

Hereinafter, description is given about an example of the determination as to which of the remote assistance and the remote driving to request based on the information that is not held by the vehicle 20.

Determination Example 1

By using detailed accident information, it is possible to determine whether the vehicle can take appropriate action by the remote assistance. Examples of the detailed accident information include information indicating an accident that obstructs a road, information indicating that only a specific lane is closed, and information indicating that the accident has already been handled. The vehicle 20 can observe a vehicle stopped on a road shoulder, but cannot observe that "a large number of metal pieces are scattered on the road". To obtain such information, it is necessary to utilize police information and the like.

Determination Example 2

By using communication status information, it is possible to determine which of the remote assistance and the remote driving to request. For example, it is difficult to use the remote driving in an environment where communication may be unstable because of busy pedestrian traffic.

Determination Example 3

Determination may be made as to which of the remote assistance and the remote driving to request based on the availability of the remote operators. For example, when the remote assistant 35 has a tight schedule and the remote driver 37 has extra time in the schedule, the remote driving is adopted even in a situation in which the remote assistance may suffice.

Determination Example 4

It is desirable for the autonomous driving that the behavior of other vehicles be easy to predict. That is, for the vehicle 20 that performs the autonomous driving, it is desirable that a vehicle whose behavior can be estimated by applying the behavior to a model or a vehicle whose behavior can be acquired in advance by vehicle-to-vehicle communication be present around the vehicle 20, rather than a vehicle that behaves unexpectedly. Therefore, when the ratio of vehicles whose behavior is easy to predict to the surrounding vehicles is equal to or higher than a threshold, the remote assistance may be adopted with priority.

As described above, in the second embodiment, the in-vehicle computer 21 and the server 32 cooperate to make the inside or outside determination on the autonomous driving domain ADD and the inside or outside determination on the remote driving domain RDD and determine which of the remote assistance and the remote driving to request. That is, the in-vehicle computer 21 and the server 32 according to the second embodiment function as a remote control request system that requests the remote assistant 35 or the remote driver 37 to remotely control the vehicle 20.

7. Remote Control Request Method of Third Embodiment

Next, a remote control request method according to a third embodiment of the present disclosure will be described with reference to FIGS. 10 to 12. In the third embodiment, when the vehicle 20 currently has or is expected to have difficulty in continuing the autonomous driving, the inside or outside determination on the autonomous driving domain and the inside or outside determination on the remote driving domain are made based on a target trajectory.

Figure 10:
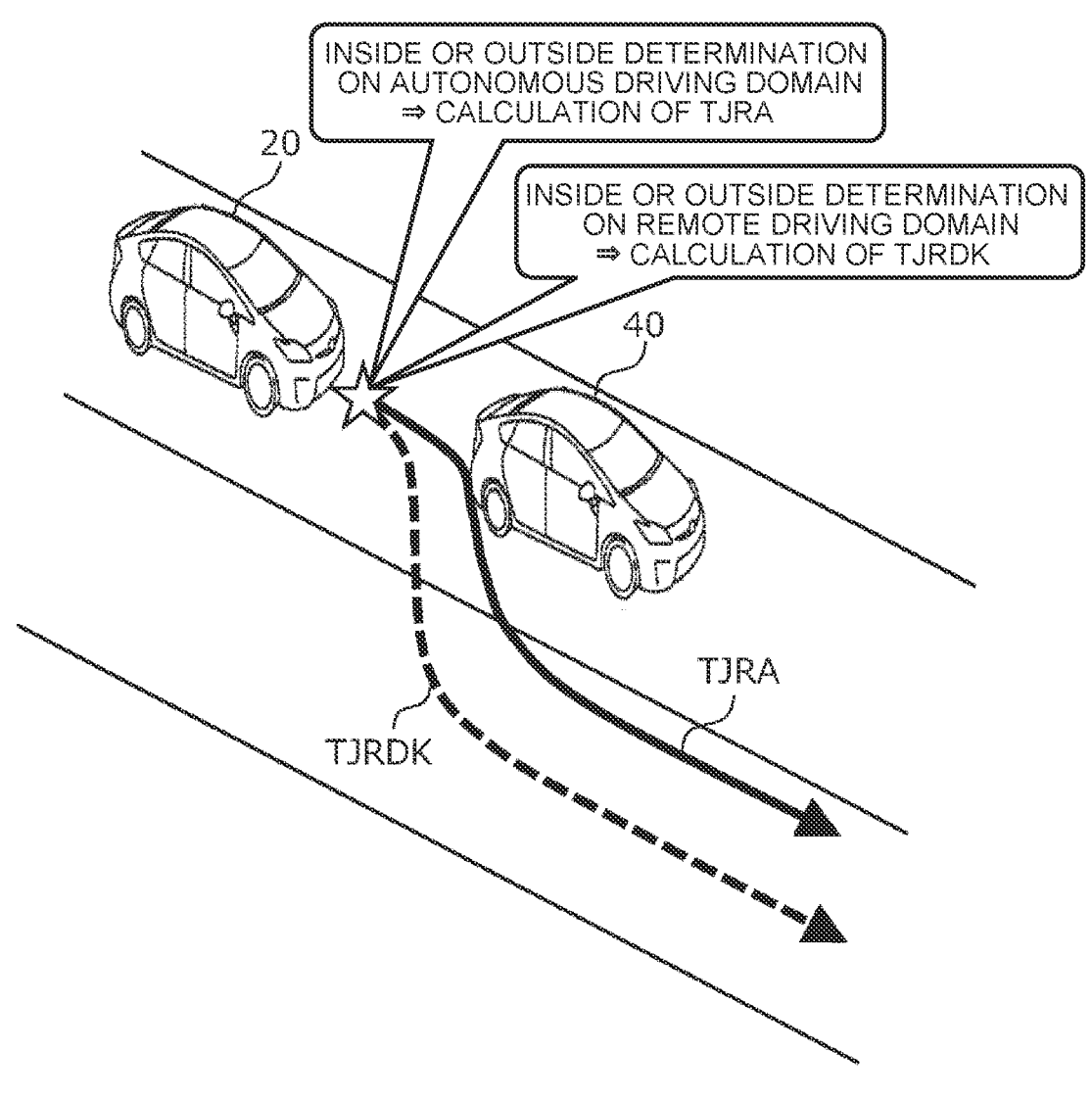
FIG. 10 is a conceptual diagram for explaining an outline of a remote control request method according to a third embodiment of the present disclosure.

FIG. 10 depicts a situation in which the vehicle 20 performing the autonomous driving stops behind a preceding vehicle 40 and then restarts. When the preceding vehicle 40 stops, it is unknown whether the preceding vehicle 40 restarts or is parked. In such a case, it is difficult to continue the autonomous driving. To continue the operation of the vehicle 20, it is necessary to request the remote operator to perform the remote control.

In the third embodiment, a trajectory TJRA of the vehicle 20 when the remote assistance is selected and a trajectory TJRDK of the vehicle when the remote driving is selected are calculated. The trajectory TJRA is calculated from the maximum steered speed, a steered angle, and the minimum vehicle speed when performing the remote assistance. Similarly, the trajectory TJRDK is calculated from the maximum steered speed, a steered angle, and the minimum vehicle speed when performing the remote driving.

Next, determination is made about contact between each of the calculated trajectories TJRA and TJRDK and the preceding vehicle 40. When the trajectory TJRA comes into contact with the preceding vehicle 40, determination can be made that the vehicle 20 is outside the autonomous driving domain. When the trajectory TJRDK comes into contact with the preceding vehicle 40, determination can be made that the vehicle 20 is outside the remote driving domain. In the example shown in FIG. 10, the trajectory TJRA is in contact with the preceding vehicle 40, but the trajectory TJRDK is not in contact with the preceding vehicle 40. Therefore, the remote driving is selected as the remote control to be requested. When neither of the trajectories TJRA and TJRDK is in contact with the preceding vehicle 40, the remote assistance request has priority based on a difference in burden between the remote assistant 35 and the remote driver 37.

Figure 11:
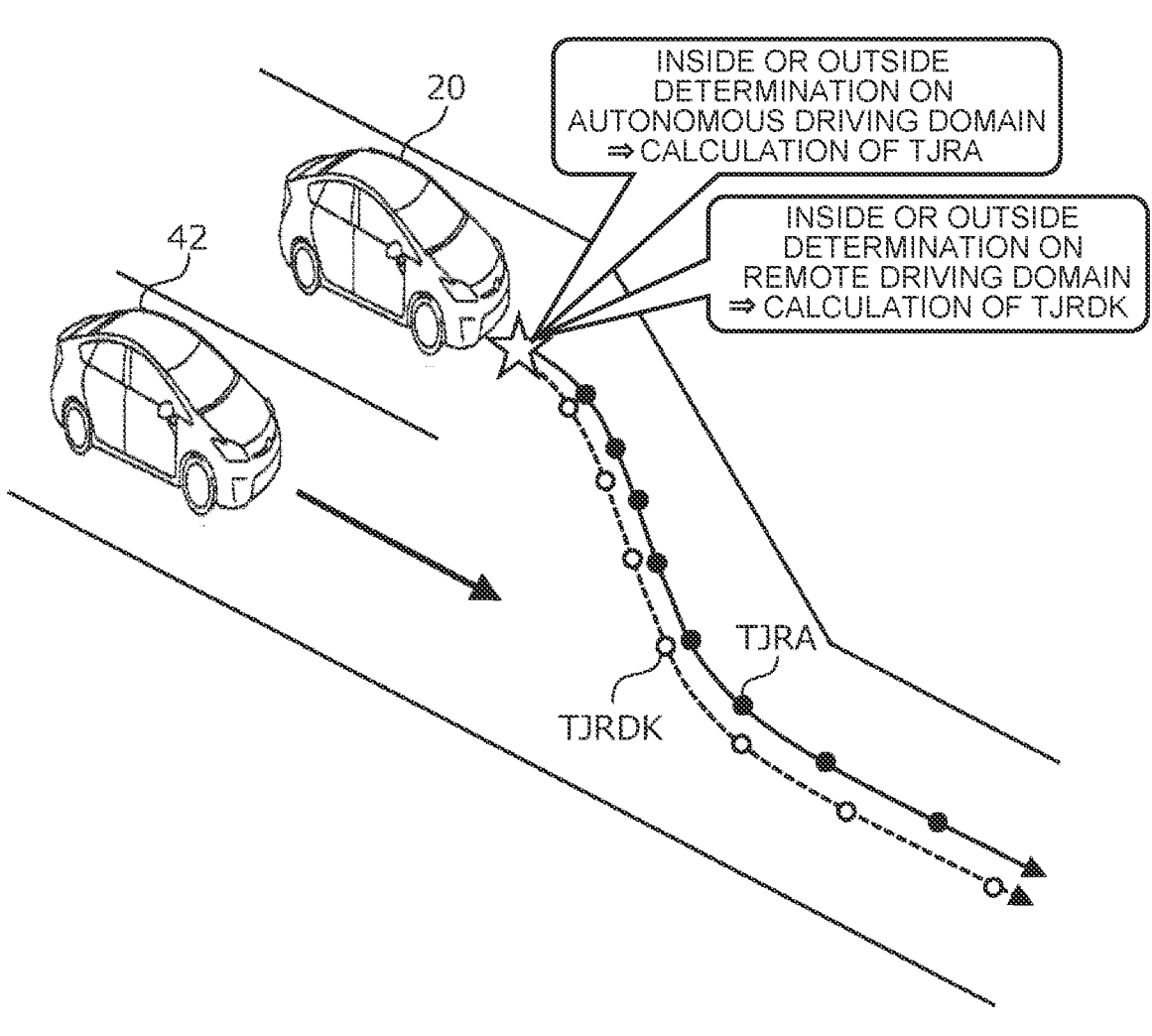
FIG. 11 is a conceptual diagram for explaining the outline of the remote control request method according to the third embodiment of the present disclosure.

FIG. 11 depicts a situation in which the vehicle 20 performing the autonomous driving joins to a main lane from a joining lane. To join to the main lane so as not to come into contact with another vehicle 42 traveling on the main lane, it is necessary to recognize the speed of the other vehicle 42 and adjust the timing to join. It is difficult to join to the main lane from the joining lane by the autonomous driving while the other vehicle 42 is traveling on the main lane. Therefore, the remote operator is requested to perform the remote control.

In the third embodiment, the trajectory TJRA of the vehicle 20 when the remote assistance is selected and the trajectory TJRDK of the vehicle when the remote driving is selected are calculated. The trajectory TJRA is calculated from the maximum speed and the maximum acceleration when performing the remote assistance. Similarly, the trajectory TJRDK is calculated from the maximum speed and the maximum acceleration when performing the remote driving. In FIG. 11, circles on the trajectories TJRA and TJRDK indicate positions of the vehicle 20 at respective times. From differences in the intervals of the circles, it can be understood that the trajectory TJRDK has a higher acceleration at the time of joining than the trajectory TJRA.

Next, the time to collision (TTC) is calculated between each of the calculated trajectories TJRA and TJRDK and the other vehicle 42. When the TTC between the trajectory TJRA and the other vehicle 42 is equal to or smaller than a predetermined threshold, determination can be made that the vehicle 20 is outside the autonomous driving domain. When the TTC between the trajectory TJRDK and the other vehicle 42 is equal to or smaller than the threshold, determination can be made that the vehicle 20 is outside the remote driving domain. When the TTC between each of the two trajectories TJRA and TJRDK and the other vehicle 42 is larger than the threshold, the remote control that provides a trajectory with a larger TTC is selected. In the example shown in FIG. 11, the remote driving is selected as the remote control to be requested.

Figure 12:
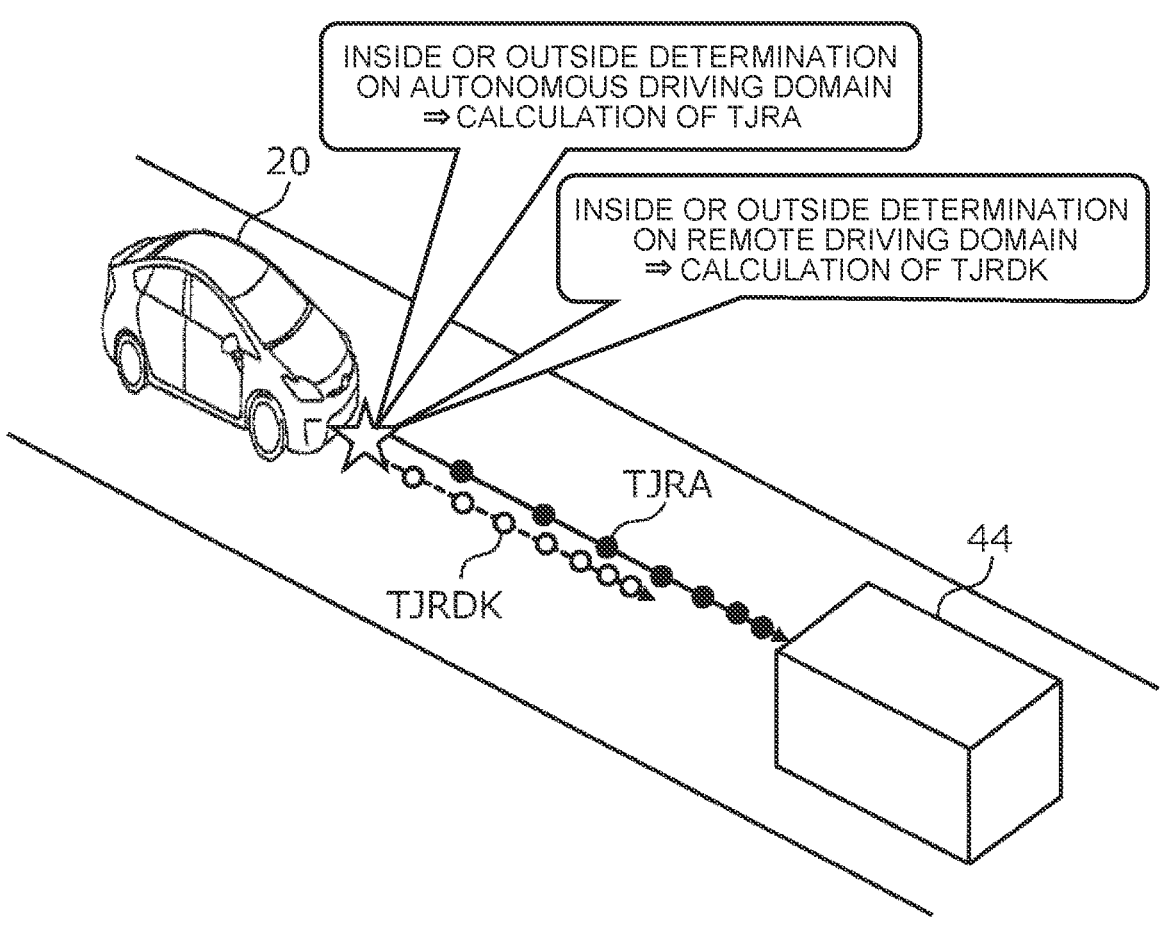
FIG. 12 is a conceptual diagram for explaining the outline of the remote control request method according to the third embodiment of the present disclosure.

FIG. 12 depicts a situation in which the vehicle 20 performing the autonomous driving decelerates and stops behind an obstacle 44. When the vehicle 20 has difficulty in stopping by the autonomous driving, the remote operator is requested to perform the remote control.

In the third embodiment, the trajectory TJRA of the vehicle 20 when the remote assistance is selected and the trajectory TJRDK of the vehicle when the remote driving is selected are calculated. The trajectory TJRA is calculated from the maximum deceleration when performing the remote assistance. Similarly, the trajectory TJRDK is calculated from the maximum deceleration when performing the remote driving. In FIG.

12, circles on the trajectories TJRA and TJRDK indicate positions of the vehicle 20 at respective times. From differences in the intervals of the circles, it can be understood that the trajectory TJRDK has a higher deceleration at the time of stopping than the trajectory TJRA.

Next, the TTC is calculated between each of the calculated trajectories TJRA and TJRDK and the obstacle 44. When the TTC between the trajectory TJRA and the obstacle 44 is equal to or smaller than a predetermined threshold, determination can be made that the vehicle 20 is outside the autonomous driving domain. When the TTC between the trajectory TJRDK and the obstacle 44 is equal to or smaller than the threshold, determination can be made that the vehicle 20 is outside the remote driving domain. When the TTC between each of the two trajectories TJRA and TJRDK and the obstacle 44 is larger than the threshold, the remote control that provides a trajectory with a larger TTC is selected. In the example shown in FIG. 12, the remote driving is selected as the remote control to be requested.

8. Other Embodiments

The server 32 may be configured as the remote control request device. That is, the server 32 may have all the functions of the in-vehicle computer 21 according to the first embodiment as the remote control request device. In this case, the server 32 monitors each vehicle 20. In response to detection of the vehicle 20 that currently has or is expected to have difficulty in continuing the autonomous driving, the server 32 requests the remote operator to remotely control the vehicle 20.

What is claimed is:

1. A remote control request system comprising:
a remote control request device including:
  a memory storing a program; and
  a processor connected to the memory, wherein the processor is configured to:
    determine that an autonomous driving vehicle has a planned trajectory that when followed would cause the autonomous driving vehicle to enter into and/or remain within a geographic location for a duration of time;
    determine that the autonomous driving vehicle detects and/or receives weather data indicative of rain or lack thereof currently and/or forecasted within the geographic location during the duration of time;
    determine that the autonomous driving vehicle detects and/or receives parking data indicative of another vehicle parked on a roadway shoulder within the geographic location during the duration of time;
    determine whether the autonomous driving vehicle is permitted to implement autonomous driving within the geographic location, wherein the autonomous driving vehicle is permitted to implement the autonomous driving in the geographic location when each of the following conditions are satisfied:
      (a) a speed limit assigned to each roadway in which the autonomous driving vehicle is traveling and/or will be traveling according to the planned trajectory within the geographic location is less than a predetermined threshold value,
      (b) map information is available for each roadway in which the autonomous driving vehicle is traveling and/or will be traveling according to the planned trajectory within the geographic location, and
      (c) the weather data indicates that there is no rain currently within and/or forecasted to be within the geographic location for the duration of time;
    upon a positive determination that the autonomous driving vehicle is permitted to implement and has implemented the autonomous driving in the geographic location, request remote assistance in which a remote operator external to the autonomous driving vehicle makes a determination for operation of the autonomous driving vehicle as it pertains to the another vehicle parked on the roadway shoulder within the geographic location during the duration of time, while the autonomous driving vehicle continues to perform the autonomous driving; and
    upon a negative determination that the autonomous driving vehicle is not permitted to implement and has not implemented the autonomous driving in the geographic location, request remote control driving in which the remote operator external to the autonomous driving vehicle remotely controls driving operations for the autonomous driving vehicle as it pertains to the another vehicle parked on the roadway shoulder within the geographic location during the duration of time, while the autonomous driving vehicle continues to not perform the autonomous driving.

2. The remote control request system according to claim 1, wherein
  following the positive determination, the processor is configured to request the remote assistance without requesting the remote control driving, or
  following the negative determination, the processor is configured to request the remote control driving without requesting the remote assistance.

3. The remote control request system according to claim 1, wherein the conditions needing to be satisfied for determining the autonomous driving vehicle is permitted to implement the autonomous driving are predetermined.

4. The remote control request system according to claim 1, wherein the conditions needing to be satisfied for determining the autonomous driving vehicle is permitted to implement the autonomous driving are adjustable conditions.

5. The remote control request system according to claim 1, wherein the determining whether the autonomous driving vehicle is permitted to implement the autonomous driving within the geographic location is based on both external information received by the autonomous driving vehicle and internal information detected and/or acquired by the autonomous driving vehicle directly.

6. The remote control request system according to claim 1, wherein
  following the negative determination, the processor is configured to request the remote control driving after verifying that one or more remote control driving conditions are satisfied, wherein the one or more remote control driving conditions must be satisfied in order for the remote control driving be permitted on the autonomous driving vehicle, and the processor is configured to stop the autonomous driving vehicle or change the planned trajectory of the autonomous driving vehicle when one or more of the remote control driving conditions are not satisfied.

7. The remote control request system according to claim 6, wherein the remote control driving conditions are predetermined.

8. The remote control request system according to claim 6, wherein the conditions needing to be satisfied for determining the autonomous driving vehicle is permitted to implement the autonomous driving are adjustable conditions.

9. The remote control request system according to claim 6, wherein the determining whether the autonomous driving vehicle is permitted to implement the autonomous driving within the geographic location is based on both external information received by the autonomous driving vehicle and internal information detected and/or acquired by the autonomous driving vehicle directly.

10. The remote control request system according to claim 1, the remote control request system further comprising a server configured to connect to the remote control request device via a communication network, wherein:

the remote control request device is mounted on the autonomous driving vehicle, and the remote control request device is configured to:
following the positive determination, cooperate with the server to request the remote assistance, and
following the negative determination, cooperate with the server to request the remote control driving.

11. The remote control request system according to claim 10, wherein:

the remote control request device is configured to transmit, to the server, the parking data indicative of the another vehicle parked on the roadway shoulder within the geographic location during the duration of time;

wherein the determining whether the autonomous driving vehicle is permitted to implement the autonomous driving within the geographic location is based on the parking data transmitted from the remote control request device and supplemental information acquired by the server and relating to the autonomous driving within the geographic location during the duration of time; and the server is configured to assist the remote control request device making the positive determination or the negative determination.

12. The remote control request system according to claim 1, wherein the geographic location has preset boundaries.

13. The remote control request system according to claim 1, wherein the geographic location has adjustable boundaries.

14. A remote control request method comprising:

determining that an autonomous driving vehicle has a planned trajectory that when followed would cause the autonomous driving vehicle to enter into and/or remain within a geographic location for a duration of time;

determining that the autonomous driving vehicle detects and/or receives weather data indicative of rain or lack thereof currently and/or forecasted within the geographic location during the duration of time;

determining that the autonomous driving vehicle detects and/or receives parking data indicative of another vehicle parked on a roadway shoulder within the geographic location during the duration of time;

determining whether the autonomous driving vehicle is permitted to implement autonomous driving within the geographic location, wherein the autonomous driving vehicle is permitted to implement the autonomous driving in the geographic location when each of the following conditions are satisfied:

(a) a speed limit assigned to each roadway in which the autonomous driving vehicle is traveling and/or will be traveling according to the planned trajectory within the geographic location is less than a predetermined threshold value, (b) map information is available for each roadway in which the autonomous driving vehicle is traveling and/or will be traveling according to the planned trajectory within the geographic location, and (c) the weather data indicates that there is no rain currently within and/or forecasted to be within the geographic location for the duration of time;

upon a positive determination that the autonomous driving vehicle is permitted to implement and has implemented the autonomous driving in the geographic location, requesting remote assistance in which a remote operator external to the autonomous driving vehicle makes a determination for operation of the autonomous driving vehicle as it pertains to the another vehicle parked on the roadway shoulder within the geographic location during the duration of time, while the autonomous driving vehicle continues to perform the autonomous driving; and upon a negative determination that the autonomous driving vehicle is not permitted to implement and has not implemented the autonomous driving in the geographic location, requesting remote control driving in which the remote operator external to the autonomous driving vehicle remotely controls driving operations for the autonomous driving vehicle as it pertains to the another vehicle parked on the roadway shoulder within the geographic location during the duration of time, while the autonomous driving vehicle continues to not perform the autonomous driving.

15. The remote control request method according to claim 14, wherein the geographic location has preset boundaries.

16. The remote control request method according to claim 14, wherein the geographic location has adjustable boundaries.

17. A non-transitory storage medium storing a program that is executable by one or more processors and that causes the one or more processors to perform functions comprising:

determining that an autonomous driving vehicle has a planned trajectory that when followed would cause the autonomous driving vehicle to enter into and/or remain within a geographic location for a duration of time;

determining that the autonomous driving vehicle detects and/or receives weather data indicative of rain or lack thereof currently and/or forecasted within the geographic location during the duration of time;

determining that the autonomous driving vehicle detects and/or receives parking data indicative of another vehicle parked on a roadway shoulder within the geographic location during the duration of time;

determining whether the autonomous driving vehicle is permitted to implement autonomous driving within the geographic location, wherein the autonomous driving vehicle is permitted to implement the autonomous driving in the geographic location when each of the following conditions are satisfied:

(a) a speed limit assigned to each roadway in which the autonomous driving vehicle is traveling and/or will be traveling according to the planned trajectory within the geographic location is less than a predetermined threshold value, (b) map information is available for each roadway in which the autonomous driving vehicle is traveling and/or will be traveling according to the planned trajectory within the geographic location, and (c) the weather data indicates that there is no rain currently within and/or forecasted to be within the geographic location for the duration of time;

upon a positive determination that the autonomous driving vehicle is permitted to implement and has implemented the autonomous driving in the geographic location, requesting remote assistance in which a remote operator external to the autonomous driving vehicle makes a determination for operation of the autonomous driving vehicle as it pertains to the another vehicle parked on the roadway shoulder within the geographic location during the duration of time, while the autonomous driving vehicle continues to perform the autonomous driving; and upon a negative determination that the autonomous driving vehicle is not permitted to implement and has not implemented the autonomous driving in the geographic location, requesting remote control driving in which the remote operator external to the autonomous driving vehicle remotely controls driving operations for the autonomous driving vehicle as it pertains to the another vehicle parked on the roadway shoulder within the geographic location during the duration of time, while the autonomous driving vehicle continues to not perform the autonomous driving.

18. The non-transitory storage medium according to claim 17, wherein the geographic location has preset boundaries.

19. The non-transitory storage medium according to claim 17, wherein the geographic location has adjustable boundaries.

* * * * *